United States Patent
Tsuchida et al.

(10) Patent No.: US 9,195,646 B2
(45) Date of Patent: Nov. 24, 2015

(54) TRAINING DATA GENERATION APPARATUS, CHARACTERISTIC EXPRESSION EXTRACTION SYSTEM, TRAINING DATA GENERATION METHOD, AND COMPUTER-READABLE STORAGE MEDIUM

(75) Inventors: Masaaki Tsuchida, Tokyo (JP); Hironori Mizuguchi, Tokyo (JP); Dai Kusui, Tokyo (JP)

(73) Assignee: NEC CORPORATION, Tokyo (JP)

(*) Notice: Subject to any disclaimer, the term of this patent is extended or adjusted under 35 U.S.C. 154(b) by 441 days.

(21) Appl. No.: 13/263,280

(22) PCT Filed: Mar. 17, 2010

(86) PCT No.: PCT/JP2010/001901
§ 371 (c)(1),
(2), (4) Date: Oct. 6, 2011

(87) PCT Pub. No.: WO2010/119615
PCT Pub. Date: Oct. 21, 2010

(65) Prior Publication Data
US 2012/0030157 A1 Feb. 2, 2012

(30) Foreign Application Priority Data
Apr. 15, 2009 (JP) .................. 2009-099183

(51) Int. Cl.
G06F 17/27 (2006.01)
G06N 3/08 (2006.01)
G06N 99/00 (2010.01)

(52) U.S. Cl.
CPC ............. *G06F 17/278* (2013.01); *G06N 3/08* (2013.01); *G06N 99/005* (2013.01)

(58) Field of Classification Search
CPC ........................................ G06N 3/08
USPC ........................................ 706/12
See application file for complete search history.

(56) References Cited

U.S. PATENT DOCUMENTS

2003/0212544 A1 11/2003 Acero et al.
2005/0234955 A1* 10/2005 Zeng et al. ............ 707/101

FOREIGN PATENT DOCUMENTS

JP 2004-005648 1/2004
JP 2006-004399 1/2006

OTHER PUBLICATIONS

Basu, S. et al., "Semi-supervised Clustering by Seeding", Proc. 19th Int'l Conf. on Machine Learning (ICML-2002), pp. 19-26, Jul. 2002.*

(Continued)

*Primary Examiner* — Kakali Chaki
*Assistant Examiner* — Vincent Gonzales
(74) *Attorney, Agent, or Firm* — Young & Thompson

(57) ABSTRACT

The disclosed apparatus uses a training data generation apparatus 2, which generates training data used for creating characteristic expression extraction rules. The training data generation apparatus 2 includes: a training data candidate clustering unit 21, which clusters a plurality of training data candidates assigned labels indicating annotation classes based on feature values containing respective context information, and a training data generation unit 22 which, by referring to each cluster obtained using the clustering results, obtains the distribution of the labels of the training data candidates within the cluster, identifies training data candidates that meet a preset condition based on the obtained distribution, and generates training data using the identified training data candidates.

31 Claims, 12 Drawing Sheets

(56) References Cited

OTHER PUBLICATIONS

Lam, L. and Suen, C.Y., Application of Majority Voting to Pattern Recognition: An Analysis of Its Behavior and Performance, Systems, Man, and Cybernetics, IEEE Trans. on, vol. 27, No. 5, Sep. 1997, pp. 553-568.*

Lee, S. and Kim, H., "News Keyword Extraction for Topic Tracking", 4th Int'l Conf. on Networked Computing and Adv. Info. Management, IEEE 2008, pp. 554-559.*

Sebastiani, F., "Machine Learning in Automated Text Categorization", ACM computing surveys, vol. 34, No. 1, 2002, pp. 1-47.*

McCallum, A., "Employing EM and Pool-Based Active Learning for Text Classification", ICML vol. 98, 1998, pp. 350-358.*

M. Gamon, "Sentiment classification on customer feedback data: noisy data, large feature vectors, and the role of linguistic analysis", Proc. 20th Int'l Conf. on Computational Linguistics, 2004, 7 pages.*

International Search Report, PCT/JP2010/001901, Jun. 1, 2010.

Tetsuji Nakagawa, Taku Kudo, Yuji Matsumoto, "Shusei Gakushuho ni yoru Keitai Sokaiseki" Information Processing Society of Japan Kenkyu Hokoku, Nov. 20, 2001, 2001-NL-146, pp. 1 to 8.

\* cited by examiner

FIG. 3A

Text data table

| ID | Text data |
|---|---|
| 1 | Yesterday, went to Fukushima on business. |
| 2 | Yesterday, went to Osaka on business with Mr. Fukushima. |
| 3 | Will go to Osaka on business. |
| ... | ... |
| 100 | During the Golden Week, went on a trip with Mr. Fukushima. |
| 101 | During the Golden Week, went on a trip to Osaka with Mr. Yamada. |
| 102 | On Christmas, gave a present to Mr. Fukushima. |
| ... | ... |
| 200 | Yesterday, went to Osaka with Mr. Tsuchida. |
| ... | ... |

FIG. 3B

Annotation data table

| Text ID | Beginning | End | Class |
|---|---|---|---|
| 1 | 5 | 7 | Personal name |
| 2 | 8 | 10 | Personal name |
| 2 | 13 | 15 | Place name |
| 3 | 4 | 6 | Place name |
| ... | ... | ... | ... |
| 100 | 3 | 5 | Personal name |
| 101 | 3 | 5 | Personal name |
| 101 | 8 | 10 | Place name |
| 102 | 6 | 8 | Personal name |
| ... | ... | ... | ... |
| 200 | 8 | 10 | Place name |
| ... | ... | ... | ... |

FIG. 4

Text (ID=2)

Yesterday, went to Osaka on business with Mr. Fukushima.

Annotation data for ID=2

| Text ID | Beginning | End | Class |
|---|---|---|---|
| 2 | 8 | 10 | Personal name |
| 2 | 13 | 15 | Place name |

Training data candidates

| Label | Word | Examples of feature values: | | | | |
|---|---|---|---|---|---|---|
| | | Second preceding word | Immediately preceding word | Immediately subsequent word | Second subsequent word | Head word of modified phrase |
| UNKNOWN | Yesterday | ( BOS | BOS | , | went | went ) |
| UNKNOWN | , | ( BOS | Yesterday | went | to | went ) |
| UNKNOWN | went | ( Yesterday | , | to | Osaka | EOS ) |
| UNKNOWN | to | ( , | went | Osaka | on | went ) |
| Place name | Osaka | ( went | to | on | business | went ) |
| UNKNOWN | on | ( to | Osaka | business | with | went ) |
| UNKNOWN | business | ( Osaka | on | with | Mr. | went ) |
| UNKNOWN | with | ( on | business | Mr. | Fukushima | Osaka ) |
| UNKNOWN | Mr. | ( business | with | Fukushima | . | Osaka ) |
| Personal name | Fukushima | ( with | Mr. | . | EOS | Osaka ) |
| UNKNOWN | . | ( Mr. | Fukushima | EOS | EOS | EOS ) |

FIG. 5
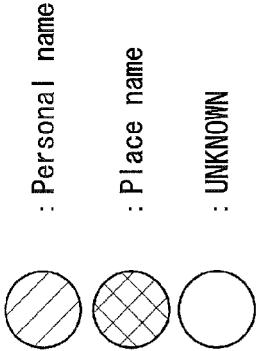
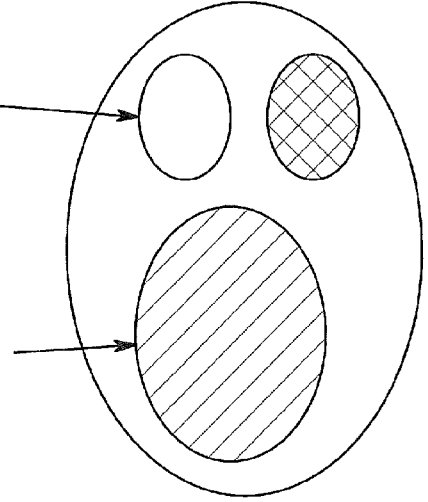
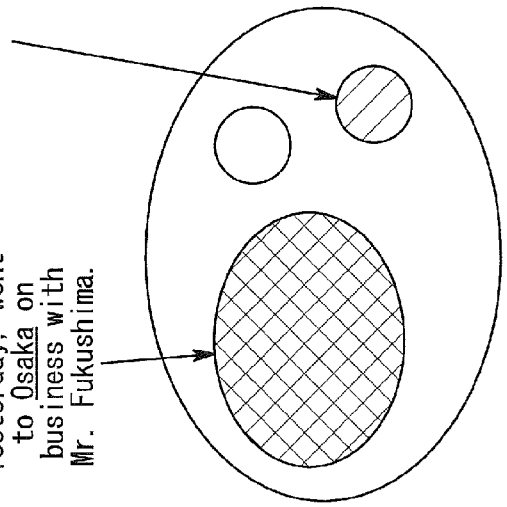
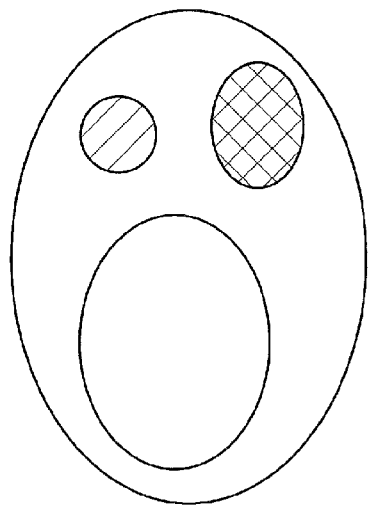

FIG. 7

Dictionary data

| Characteristic expression | Class |
|---|---|
| Fukushima | Personal name |
| Yamada | Personal name |
| ... | ... |
| Osaka | Place name |
| Nara | Place name |
| ... | ... |

TRAINING DATA GENERATION APPARATUS, CHARACTERISTIC EXPRESSION EXTRACTION SYSTEM, TRAINING DATA GENERATION METHOD, AND COMPUTER-READABLE STORAGE MEDIUM

TECHNICAL FIELD

The present invention relates to a training data generation apparatus for generating training data necessary for creating characteristic expression extraction rules, a characteristic expression extraction system using the same, a training data generation method, and a computer-readable storage medium.

BACKGROUND ART

In recent years, high expectations have been placed on efficient utilization of large amounts of textual information. Large amounts of text contain characteristic expressions with special meanings, such as personal names, place names, and names of organizations (hereinafter, groupings based on special meanings are referred to as "classes"). Recognizing these characteristic expressions is useful in systems utilizing textual information, such as question answering systems, document classification systems, machine translation systems, etc. For example, question answering systems have supposedly been imparted with characteristic expression recognition functionality. In such a case, it is not hard to imagine that imparting recognition functionalities improves the accuracy of responding because, in response to the question "Who is the Prime Minister of Japan?", a question answering system can recognize a characteristic expression, i.e. "personal name", and return the corresponding personal name. As used herein, the term "characteristic expression" designates an expression that has a specific meaning and refers to nouns with specific meanings, such as personal names, place names, job titles, or animal names, etc., or adjectives that have the meaning of evaluation expressions, such as "good", "bad", etc.

A method involving the creation of ground truth data (training data) obtained by annotating expressions belonging to classes that it is desired to extract from a text and acquisition of extraction rules (characteristic expression extraction rules) from the ground truth data with the help of machine learning is well known in prior-art characteristic expression recognition (extraction) technology. This method allows for excellent efficiency to be achieved in the recognition of characteristic expressions. However, the above-mentioned method is expensive to use because it requires annotation to be accurately assigned to the ground truth data in an omission-free manner. For this reason, low-cost ground truth data generation is an important requirement in characteristic expression recognition technology.

For instance, Patent Document 1 discloses an example of a system capable of creating conventional ground truth data at low cost. The system according to Patent Document 1 includes: a ground truth data storage unit that stores ground truth data, a ground truth expansion unit, and a rule learning unit. The ground truth expansion unit retrieves ground truth data from the ground truth data storage unit and performs word order operations, syntactic representation conversion, and specific representation conversion, etc., thereby generating expanded data produced by expanding the ground truth data. The rule learning unit learns extraction rules using both the ground truth data and the generated expanded data as training data.

Thus, in the system according to Patent Document 1, new ground truth data (expanded data) are created in large quantities by modifying the word order of the ground truth data, changing representations, etc. Accordingly, it is believed that using the system according to Patent Document 1 allows for the amount of training data to be increased at low cost.

CITATION LIST

Patent Document

Patent Document 1: JP 2006-004399A (pp. 5-9).

DISCLOSURE OF THE INVENTION

Problem to be Solved by the Invention

However, despite the fact that the above-described system according to Patent Document 1 allows for cost reduction to be realized based on reducing the number of operations involved in the creation of ground truth data, the cost of ground truth data creation is still believed to be high for the following reasons.

Namely, in order to create ground truth data, a person needs to read a text and then carefully verify whether characteristic expressions in the text have been annotated in an accurate and omission-free manner, which is a costly process. However, even in the above-mentioned system according to Patent Document 1, reducing such costs is not easy and lowering the cost of ground truth data creation is still a difficult task.

It should be noted that, in the foregoing, the phrase "omission-free" refers to annotating all of the characteristic expressions to be extracted that appear in a text and the word "accurate" refers to characteristic expressions having annotations assigned thereto in an accurate manner, with all of the appended annotations being correct.

It is an object of the present invention to provide a training data generation apparatus, a characteristic expression extraction system, a training data generation method, and a computer-readable storage medium that eliminate the above-described problems, thereby making it possible to render accurate and omission-free annotation operations unnecessary and permitting a reduction in the cost involved in generating training data used for creating characteristic expression extraction rules.

Means for Solving the Problem

In order to attain the above-described object, the training data generation apparatus used in the present invention, which is a training data generation apparatus that generates training data used for creating characteristic expression extraction rules, includes: a training data candidate clustering unit that clusters multiple training data candidates assigned labels indicating annotation classes based on feature values containing respective context information, and a training data generation unit that, by referring to each cluster obtained using the clustering results, obtains the distribution of the labels of the training data candidates within the cluster, identifies training data candidates that meet a preset condition based on the obtained distribution, and generates training data using the identified training data candidates.

In order to attain the above-mentioned object, the characteristic expression extraction system used in the present invention includes the above-described training data generation apparatus used in the present invention and a characteristic expression extraction apparatus. The characteristic expression extraction apparatus uses the training data generated by the training data generation apparatus to learn characteristic expression extraction rules used to extract characteristic expressions and extracts characteristic expressions from a corpus containing multiple documents using the learned characteristic expression extraction rules.

In addition, in order to attain the above-mentioned object, the training data generation method used in the present invention, which is a training data generation method used for generating training data utilized in the creation of characteristic expression extraction rules, includes the steps of (a) clustering multiple training data candidates assigned labels indicating annotation classes based on feature values containing respective context information and, (b) by referring to each cluster obtained using the clustering results in Step (a), obtaining the distribution of the labels of the training data candidates within the cluster, identifying training data candidates that meet a preset condition based on the obtained distributions, and generating training data using the identified training data candidates.

Furthermore, in order to attain the above-mentioned object, the computer-readable storage medium used in the present invention, which is a computer-readable storage medium having recorded thereon a software program utilized by a computer in the generation of training data used for creating characteristic expression extraction rules, has recorded thereon a software program containing instructions that direct the computer to perform the steps of (a) clustering multiple training data candidates assigned labels indicating annotation classes based on feature values containing respective context information and, (b) by referring to each cluster obtained using the clustering results in Step (a), obtaining the distribution of the labels of the training data candidates within the cluster, identifying training data candidates that meet a preset condition based on the obtained distributions, and generating training data using the identified training data candidates.

Effects of the Invention

Due to the above-described features, the training data generation apparatus, characteristic expression extraction system, training data generation method, and computer-readable storage medium used in the present invention render accurate and omission-free annotation operations unnecessary and, as a result, can reduce the cost involved in generating training data used for creating characteristic expression extraction rules.

BRIEF DESCRIPTION OF THE DRAWINGS

FIG. 3 is a diagram illustrating a specific example of the data stored in the incomplete ground truth corpus storage unit shown in FIG. 1, with FIG. 3(a) illustrating a text data table and FIG. 3(b) illustrating an annotation data table.

FIG. 4 is diagram illustrating a specific example of training data candidates generated by the training data candidate generation unit shown in FIG. 1.

FIG. 5 is diagram illustrating a specific example of processing results generated by the training data candidate clustering unit shown in FIG. 1.

FIG. 7 is diagram illustrating a specific example of dictionary data stored in the dictionary data storage unit shown in FIG. 6.

BEST MODE FOR CARRYING OUT THE INVENTION

Summary of the Invention

Figure 1:
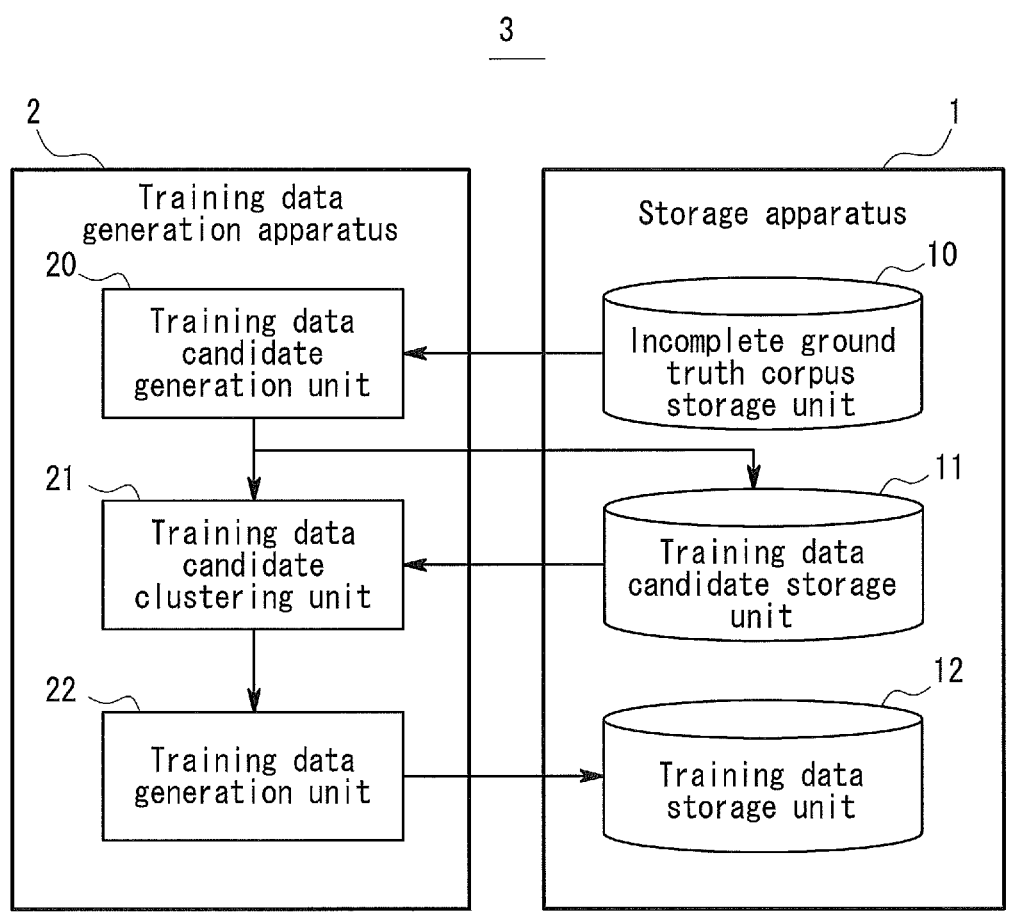
FIG. 1 is a block diagram illustrating the configuration of the training data generation apparatus used in Embodiment 1 of the present invention.

In the present invention, the training data can be generated, for example, from an incomplete ground truth corpus (hereinafter referred to as "incomplete ground truth corpus"). The term "incomplete ground truth corpus" refers to data obtained by appending annotation to some characteristic expressions in a text. In addition, an incomplete ground truth corpus may contain a certain, albeit small, proportion of incorrect annotation.

Such an incomplete ground truth corpus can be created at very low cost. For example, annotation can be appended to the text that constitutes the corpus by searching the corpus for the character strings of known characteristic expressions and reading only the retrieved locations. In addition, since an incomplete ground truth corpus may include annotation errors, if a large portion of the appended annotation is expected to be correct, the corpus may be created by performing machine annotation on the locations of occurrence of the retrieved characteristic expression character strings.

However, when training data is created directly from an incomplete ground truth corpus, the created training data end up containing "annotation errors" and "annotation omissions". The terms "annotation error" and "annotation omission" are explained below by providing examples, in which the classes of the target characteristic expressions are "personal names" and "names of organizations."

First of all, it should be noted that the term "annotation error" describes a situation, in which annotation has been performed, but the class of the annotated characteristic expression is not the true class of this characteristic expression. An example would be a situation, in which "Tsuchida" in "Tsuchida Electric (Inc.)" is annotated as a personal name. The correct name is "Tsuchida Electric", classified as an organization name. In addition, the term "annotation omission" refers to a situation, in which a characteristic expression has not been annotated. An example of that would be a situation, in which "Yamada" in "Yamada works for NEC" has not been annotated. The correct way of doing this is that "Yamada" has to be annotated as a personal name.

Incidentally, training data that includes the above-described annotation errors and annotation omissions is not suitable for use in characteristic expression recognition technology. However, it is believed that in an incomplete ground truth corpus, "most of the annotated locations are correct" and "training data with similar feature values are very likely to belong to the same class." Accordingly, the present invention uses clustering techniques to detect "annotation errors" and "annotation omissions" in an incomplete ground truth corpus containing training data candidates, thereby enabling automatic generation of correct training data.

Specifically, in the present invention, the first step is to prepare or generate training data candidates, whose units are words from an incomplete ground truth corpus or word strings put together by some means (please refer to the "training data candidate generation unit 20" illustrated in the hereinafter described FIG. 1). When training data candidates are generated, the annotation of the incomplete ground truth corpus is referred to, and class information is appended to the labels of the training data candidates at such time. Non-annotated expressions, with regard to which it is not known whether they are characteristic expressions or not, are labeled as "UNKNOWN". In addition, if the parts of speech that constitute the characteristic expressions are known during the generation of training data candidates, the words or word strings used as training data candidates can be singled out by parts of speech.

In addition, in the present invention, the utilized training data candidates and the training data generated therefrom are each composed of data having labels and feature values. The labels are assigned by referring to the annotation information of the incomplete ground truth corpus. The feature values contain at least contextual information (context information) such as individual words, modifying or modified phrases in the vicinity of the units that constitute the training data candidates or training data (see FIG. 4 described below). In addition, the feature values may be represented in a format suitable for learning algorithms used for learning the extraction rules, such as vectors, attribute-attribute value tables, and the like.

Next, in the present invention, the prepared or generated training data candidates are subjected to clustering (see the "training data candidate clustering unit 21" illustrated in FIG. 1, which is described below). Any existing methods, such as k-means and PLSI (Probabilistic Latent Semantic Indexing), etc., can be used as the clustering methods in this case.

Subsequently, in the present invention, after performing clustering, training data is generated from the training data candidates based on the distribution of the labels of the training data candidates within each cluster. In the present invention, the generation of training data at such time is performed based on the above-described assumptions that "most of the annotated locations are correct" and "training data with similar feature values are very likely to belong to the same class."

Here, it is assumed that training data candidates with similar feature values belong to the same cluster. For example, in a cluster containing a large number of training data candidates labeled as class A, the training data candidates contained therein can be considered most likely to belong to class A. Conversely, in a cluster containing a small number of training data candidates labeled as class A, the training data candidates contained therein can be considered most unlikely to belong to class A. In addition, words of the same class tend to be used in a similar way, and at least if context information is contained in the feature values, words of the same class tend to belong to the same cluster. Accordingly, in the present invention, the feature values include context information.

In addition, in the present invention, the distribution of the labels of the training data candidates within the clusters is used in the selection (generation) of the training data. Accordingly, the four points [A]-[D] below are considered as indicators of the goodness of the clustering results. The clustering parameters and end conditions are configured by using the points [A]-[D] below as indicators.

[A] The distribution of the labels within each cluster varies between the clusters.

[B] There is a single label with the highest percentage within each cluster.

[C] The number of training data candidates within the clusters exceeds a specified number.

[D] The number of segments (number of clusters) obtained during clustering is smaller than a specified number.

Furthermore, in the present invention, as described above, the annotation errors and annotation omissions are subject to detection. For example, based on the clustering results, class-A data elements included in a cluster where classes other than class A are predominant are detected as annotation errors. In addition, data elements with other labels (including "UNKNOWN") within a cluster where class A is predominant are detected as annotation omissions. The training data is generated with the detected annotation errors and annotation omissions in mind (see the training data generation unit 22 shown in FIG. 1, which is described below).

Specifically, as an example, let us illustrate this using four sentences: (1) "<Tsuchida: Personal name> works for <NEC: Name of organization>", (2) "<Tsuchida: Personal name> works for <Yamada: Personal name> Electric", (3) "Takeda works for <Nippon Electric: Name of organization>", and (4) "<Tsuchida: Personal name> works for <Nippon Electric: Name of organization>".

In the above-described four sentences, "<Word: Class>" represents the fact that the "Word" is annotated as a characteristic expression belonging to the "Class". "Yamada" in Sentence (2), which is between "Tsuchida", located two words before it, and the modified phrase "works for", corresponds to "NEC" in Sentence (1) and "Nippon Electric" in Sentence (4). Accordingly, "Yamada" in Sentence (2) belongs to the same cluster because the context is similar to that of "NEC" in Sentence (1) and "Nippon Electric" in Sentence (4). In this manner, even though the class of "Yamada" in Sentence (2) is "personal name", it can be categorized as an annotation error due to the fact that it belongs to a cluster where "organization names" are predominant. In a similar manner, "Takeda" in Sentence (3) relates to the modified phrase "works for" in the same way as "Tsuchida" in Sentence (1), Sentence (2) and Sentence (4). For this reason, "Takeda" in Sentence (3) belongs to the same cluster as "Tsuchida" in Sentence (1), Sentence (2), and Sentence (4). Accordingly, while "Takeda" in Sentence (3) does belong to a cluster where "personal names" are predominant, it can be categorized as an annotation omission due to the fact that it is not annotated.

Whether or not the thus detected annotation errors and annotation omissions are actual annotation errors or annotation omissions can only be determined by manual means. However, in the present invention, simply removing all of them from the training data candidates is sufficient to produce training data. The reasons for this are explained below.

In a false detection of an annotation error occurs, the class indicated by the annotation is the correct class, but it can be assumed that there is a lot of other training data with correct classes, which are falsely detected. In addition, an error occurring as a result of inability to detect an annotation omission means that annotation is not appended to a characteristic expression and it is handled as a non-characteristic expression. In this case, similar to a false detection of an annotation error, it can be assumed that there is a lot of other training data handled as non-characteristic expressions. In other words, removal produces little effect in the case of false detection of annotation errors and annotation omissions. Conversely, if we assume that falsely detected annotation errors and annotation omissions are not removed, then errors and omissions that are not falsely detected are left intact as well. In such a case, there is a chance that the ground truth data may contain either annotation errors or annotation omissions, or both. This means that the inclusion of incorrect ground truth data has a negative effect on the learning of extraction rules.

However, when the correct labels of the training data candidates representing annotation errors and annotation omissions can be inferred, the labels of these training data candidates may be changed to the correct labels and these training data candidates provided with modified labels may be added to the training data. Correct label estimation can be performed by calculating the probability (reliability) that the labels of the training data candidate determined to be annotation errors or annotation omissions may occupy a high percentage of the clusters to which they belong. Then, when the reliability level is higher than a configured threshold value, the labels of the training data candidates determined to be annotation errors or annotation omissions can be converted to the labels occupying a high percentage of the clusters to which they belong. Furthermore, when the distance between the target training data candidates and the representative points of the clusters is small, when the target training data candidates appear within a high-density space in the clusters, or when the probability of cluster membership of the target training data candidates is high, etc., it is sufficient to use parameters set to high values as the reliability levels. In addition, the threshold values used for making a determination may be appropriately configured in accordance with recognition results obtained using the training data.

In addition, in the present invention, when the training data is generated, it is possible to use only the label information from the training data candidates and re-acquire the necessary feature values once again. For example, it is possible to use only the contextual information as the feature values of the training data candidates and add the parts of speech of the words or word strings themselves, as well as surface character strings and other information contained in words in the process of generating the training data.

Thus, the training data generation apparatus of the present invention includes, for example: a training data candidate generation unit that prepares or generates training data candidates that are assigned labels by referring to incomplete annotation information using either words from incomplete ground truth data or word strings put together by some means as units; a training data candidate clustering unit that clusters the training data candidates; and a training data generation unit that refers to the clusters obtained from the clustering results and generates training data from the training data candidates using the distribution of the labels of the training data candidates within each cluster.

Embodiment 1

Below, the training data generation apparatus and training data generation method used in Embodiment 1 of the present invention will be described with reference to FIG. 1-FIG. 5. First of all, the configuration of the training data generation apparatus used in Embodiment 1 will be described with reference to FIG. 1. FIG. 1 is a block diagram illustrating the configuration of the training data generation apparatus used in Embodiment 1 of the present invention.

The training data generation apparatus 2 used in Embodiment 1, which is illustrated in FIG. 1, is an apparatus generating training data used for creating characteristic expression extraction rules. The characteristic expression extraction rules are rules used for characteristic expression recognition in question-answering systems, documentation systems, machine translation systems, etc.

As shown in FIG. 1, the training data generation apparatus 2 includes: a training data candidate clustering unit 21, and a training data generation unit 22. The training data candidate clustering unit 21 performs clustering on multiple training data candidates labeled with annotation classes based on feature values containing respective context information.

The training data generation unit 22 obtains the distribution of the labels of the training data candidates within each cluster by referring to each cluster obtained from the clustering results. In addition, based on the obtained distribution, the training data generation unit 22 identifies training data candidates that meet a preset condition and generates training data using the identified training data candidates.

In this manner, the distribution of the labels is obtained by clustering based on the feature values. The training data candidates associated with annotation errors or annotation omissions can be readily estimated from the label distribution results. This makes it possible to select that training candidates that are unlikely to be associated with annotation errors or annotation omissions without manual intervention. Accordingly, the use of the training data generation apparatus 2 allows for the cost of training data generation to be reduced because correct training data used for creating characteristic expression extraction rules can be generated without accurate and omission-free annotation operations.

Here, the training data generation apparatus 2 will be described more specifically. In Embodiment 1, the training data generation apparatus 2, together with a storage apparatus 1, forms a training data generation system 3. The storage apparatus 1 stores an incomplete ground truth corpus, training data candidates generated by the training data generation apparatus 2 from the incomplete ground truth corpus, and training data. In addition, as described below, the training data generation apparatus 2 can be implemented using a computer and operates under program control. In addition, the storage apparatus 1 can be implemented using a storage apparatus incorporated into the computer used to implement the data generation apparatus 2 or a storage apparatus in another computer, etc., connected to this computer via a network.

As shown in FIG. 1, the storage apparatus 1 includes an incomplete ground truth corpus storage unit 10, a training data candidate storage unit 11, and a training data storage unit 12. The incomplete ground truth corpus storage unit 10 stores an incomplete ground truth corpus. The incomplete ground truth corpus, as described above, is obtained by appending class-indicating annotations to some of the characteristic expressions subject to extraction from the text and consists of data that may contain errors and omissions in such annotations.

For example, the incomplete ground truth corpus includes text data and annotation data indicating the class of the characteristic expressions and character numbers between which the class is found in the text data. In particular, in the case of "Tsuchida works for Nippon Electric", the annotation data is "0:2: Personal name (a personal name is between character 0 and character 2)" and "3:7: Name of organization (a name of organization is between character 3 and character 7). If the text data has been morphologically parsed, word numbers can be used in the annotation data instead of the character numbers.

The training data candidate storage unit 11 stores training data candidates generated by the hereinafter described training data candidate generation unit 20. The training data candidates are a collection of data comprising feature values and labels that indicate classes (hereinafter referred to as "class labels"). In this embodiment, as described above, the feature values are preferably represented in a format suitable for learning algorithms used for learning extraction rules, such as vectors, or attribute-attribute value tables, etc.

The training data storage unit 12 stores training data used for creating characteristic expression extraction rules generated by the training data generation unit 22 using the training data candidates. In the same manner as the training data candidates, the training data is a collection of data comprising class labels and feature values. In the training data, the feature values are also preferably represented in a format suitable for learning algorithms used for learning extraction rules, such as vectors or attribute-attribute value tables, etc.

In addition, as shown in FIG. 1, in addition to the training data candidate clustering unit 21 and training data generation unit 22, the training data generation apparatus 2 further includes a training data candidate generation unit 20. The training data candidate generation unit 20 reads out text data from the incomplete ground truth corpus storage unit 10 and generates training data candidates from the text data contained in the corpus that has been read. In addition, the training data candidate generation unit 20 stores the generated training data candidates in the training data candidate storage unit 11.

In Embodiment 1, the training data candidate generation unit 20 segments the text data read from the incomplete ground truth corpus storage unit 10. Each segment produced by the segmentation constitutes a single training data candidate unit. In this case, a single training data candidate unit is a word or a word string put together by some means. Furthermore, term strings extracted using existing term extraction techniques or word strings matched using the headwords of large dictionaries such as the Wikipedia, etc., are suggested as examples of the word strings put together by some means. Furthermore, the word strings put together in sentence units, with "." and other punctuation marks used as separator characters, are suggested as well.

In addition, in Embodiment 1, the training data candidate generation unit 20 uses the text data and annotation information assigned to each word contained in the text data to detect feature values containing context information for every single unit to be used as a training data candidate and generates training data candidates by appending the feature values to each unit.

In particular, first of all, the training data candidate generation unit 20 assigns class information to the labels of the training data candidates by referring to the annotation of the incomplete ground truth corpus. When there is no annotation, it appends a label such as "UNKNOWN", which indicates that the class is unknown. The feature values include contextual information. In addition, when the number of candidates can be narrowed down under empirical conditions, such as by parts of speech constituting the characteristic expressions, the training data candidate generation unit 20 can generate training data candidates from words or word strings selected under such conditions. Furthermore, when there are more units with "UNKNOWN" labels in comparison with other classes, the training data candidate generation unit 20 can adjust their number using random sampling etc.

In this embodiment, the training data candidate clustering unit 21 retrieves data from the training data candidate storage unit 11, performs clustering using the feature values of the training data candidates, and transfers the clustering results to the training data generation unit 22. Any methods can be used for clustering. In addition, the training data candidate clustering unit 21, which considers the four points [A]-[D] described above as the indicators of the goodness of the clustering results, considers any one or more, but preferably all the four points [A]-[D]. The clustering parameters and end conditions are configured appropriately in order to obtain the required clustering results.

The reason for considering the above-described indicators is that the training data generation unit 22, which performs the subsequent processing, uses the distribution of the labels as a clue to detect annotation errors and annotation omissions and, based on that, generate training data. In other words, if the distribution of the labels is skewed between the clusters and, in addition, there is a single class with a high percentage within a single cluster, the detection of the annotation errors and annotation omissions is facilitated.

However, when k-means and other algorithms utilizing the number of clusters as a parameter are used as clustering techniques, it is preferable to configure the value of the number of clusters such that the number of data elements in the clusters does not become too small. In addition, when using algorithms utilizing the threshold value of similarity between two data elements as a parameter, it is also preferable to configure the value of the parameter such that the number of data elements in the clusters does not become too small. In that manner, similar training data candidates pool inside a single cluster and the distribution of the labels can be easily revealed.

In Embodiment 1, the training data generation unit 22 receives the results of the training data candidate clustering unit 21 and detects training data candidates representing annotation errors or annotation omissions based on the distribution of the labels within each cluster. In addition, the training data generation unit 22 generates training data from the training data candidates by removing the detected training data candidates or by changing the labels of the detected training data candidates. The generated training data is stored in the training data storage unit 12.

In particular, in Embodiment 1, the training data generation unit 22 identifies training data assigned a specified label in the cluster containing the specified label at or above a predetermined percentage as training candidates satisfying the preset conditions. The identified training candidates are treated as training data. On the other hand, the training data candidates that are not assigned the specified labels are treated as training data candidates representing annotation errors or annotation omissions.

In other words, in Embodiment 1, based on the clustering results, the training data generation unit 22 determines that an annotation error of a certain class constitutes data of that class contained in a cluster having more labels of another class. In addition, based on the clustering results, the training data generation unit 22 determines that annotation omissions represent data with other labels within clusters where a certain class is predominant. A determination as to whether or not a class contained within the cluster is predominant can be made by determining whether the percentage of a certain class exceeds (is equal to or greater than) a predetermined percentage.

In addition, in Embodiment 1, for training data candidates that are not assigned the specified labels and are contained in clusters including the specified labels at or above a predetermined percentage, the training data generation unit 22 can obtain the degree of membership in said clusters (hereinafter referred to as "confidence level"). In this case, the training data generation unit 22 treats training data candidates whose confidence level is equal to or greater than a threshold value as training data and can delete training data candidates whose confidence level is less than the threshold value from the set of training data candidates. It should be noted that confidence levels can be considered as the above-described "reliability levels".

In other words, the training data generation unit 22 treats training data candidates associated with high-confidence annotation errors and annotation omissions as training data with labels determined by the clusters and may remove training data candidates associated with other annotation errors and annotation omissions errors.

The distance between the training data candidates and the representative points of the clusters, the estimated density of the training candidate data in the clusters, the percentages of the specified labels contained in the clusters, etc. are suggested as the above-mentioned confidence levels. In addition, if the distributions obtained by clustering are combined probability distributions, then the probabilities of cluster membership of the training data candidates are suggested as the confidence levels. As described above, predetermined threshold values are used to determine whether the confidence levels are high. The threshold values used in making such a determination may be appropriately configured in accordance with the recognition results obtained using the training data. In addition, the training data candidates may be sorted by the confidence level, with a fixed percentage of the training data candidates adopted as the training data.

In addition, in Embodiment 1, the training data generation unit 22 can attach new feature values to the training data candidates used as training data. In other words, in Embodiment 1, the training data generation unit 22 can extract only the label information from the feature values of the training data candidates and, by appending new feature values thereto, can use them as the feature values of the training data. For example, if only contextual information is used as the feature values of the training data candidates, then, during training data generation, the training data generation unit 22 can add information contained in words, such as the parts of speech and surface character strings of the words or word strings themselves.

It should be noted that, in Embodiment 1, the training data generation apparatus 2 may be configured without the training data candidate generation unit 20. In other words, Embodiment 1 may be configured such that processing corresponding to the processing performed by the training data candidate generation unit 20 is performed in advance and the training data candidates are stored in the training data candidate storage unit 11.

Figure 2:
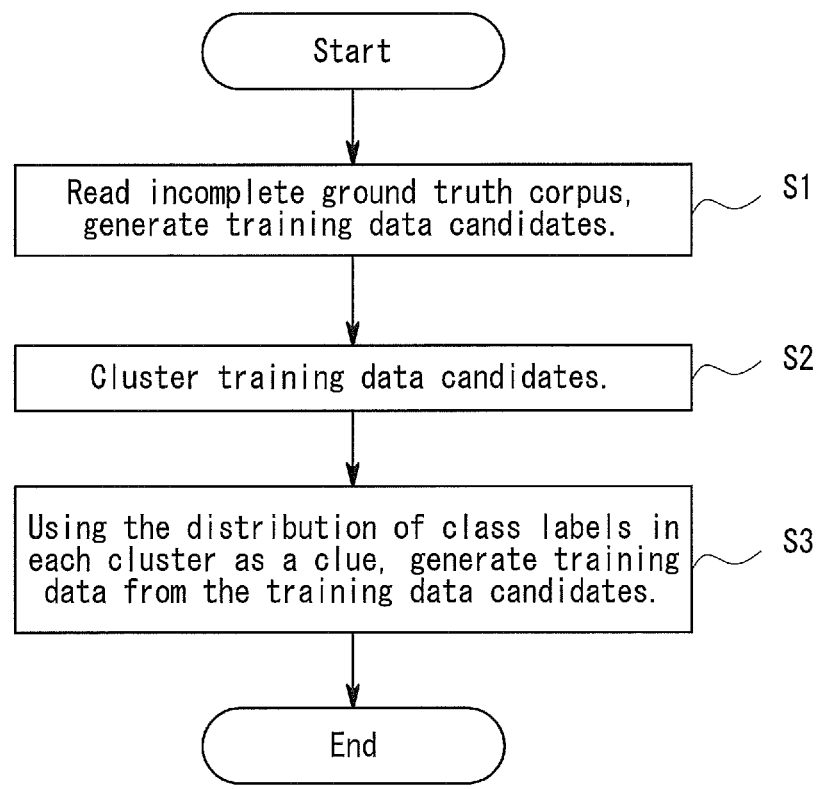
FIG. 2 is a flow chart illustrating the operation of the training data generation apparatus used in Embodiment 1 of the present invention.

Next, the operation of the training data generation apparatus 2 used in Embodiment 1 of the present invention will be described with reference to FIG. 2-FIG. 5. FIG. 2 is a flow chart illustrating the operation of the training data generation apparatus used in Embodiment 1 of the present invention. In the description that follows, the generation of training data used for creating characteristic expression extraction rules employed in the recognition of personal names and place names is used as an example. It should be noted that the training data generation method used in Embodiment 1 can be implemented by operating the training data generation apparatus 2 shown in FIG. 1. Accordingly, the following description of the operation of the training data generation apparatus 2 is substituted for the description of the training data generation method used in Embodiment 1. In addition, in the description that follows, refer to FIG. 1 as appropriate.

As shown in FIG. 2, first of all, the training data candidate generation unit 20 reads out text data from the incomplete ground truth corpus storage unit 10 and generates training data candidates from the text data contained in the corpus (Step S1 in FIG. 2). The training data candidates generated in Step S1 is stored in the training data candidate storage unit 11.

Here, an example of the data stored in the incomplete ground truth corpus storage unit 10 will be described with reference to FIG. 3. FIG. 3 is a diagram illustrating a specific example of the data stored in the incomplete ground truth corpus storage unit shown in FIG. 1, with FIG. 3(*a*) illustrating a text data table and FIG. 3(*b*) illustrating an annotation data table.

Referring now to FIGS. 3(*a*) and 3(*b*), the incomplete ground truth corpus storage unit 10 stores a text data table listing text data and an annotation data table listing annotation data.

The text data table shown in FIG. 3 (*a*) is composed of text data and IDs, i.e. its identifiers. The text IDs of the annotation table shown in FIG. 3 (*b*) are related to the IDs of the text data table. In the annotation table, "Beginning" represents an initial character number, "End" represents a final character number, "Class" represents annotated class information. In other words, the data in the first row of the annotation table indicates that the item with the ID of 1 in the text data table is annotated as "personal name" between character 5 and character 7. The character number is a value obtained by counting from 0.

In particular, from the examples of FIGS. 3(*a*) and 3(*b*), it can be seen that "Fukushima" has been annotated as a personal name. However, since it is actually a place name, this is an annotation error. In addition, it can be seen that "Tsuchida", which is located between character 3 and character 5 of the item with the ID of 200 in the annotation table, has not been annotated as a personal name. This is an example of an annotation omission.

The training data candidate generation unit 20 generates training data candidates from such an incomplete ground truth corpus. FIG. 4 is diagram illustrating a specific example of training data candidates generated by the training data candidate generation unit shown in FIG. 1. FIG. 4 is used to explain an example of training data candidates created from the text item with the ID of 2 shown in FIGS. 3(*a*) and 3(*b*).

In the example of FIG. 4, the training data candidate generation unit 20, by referring to the annotation table (FIG. 3 (*b*)), assigns class information to the labels of annotated words and assigns "UNKNOWN" to the labels of non-annotated words, which represents the fact that their class is unknown.

The feature values include "the second preceding word", "the immediately preceding word", "the immediately subsequent word", "the second subsequent word", and "the main word of the modified phrase". Thus, as shown in FIG. 4, the training data candidates include feature values and labels that represent class information. The training data candidate generation unit 20 generates training data candidates in this manner and stores the results in the training data candidate storage unit 11.

Next, the training data candidate clustering unit 21 reads the training candidate data stored in the training data candidate storage unit 11 and uses the feature values to cluster the training data candidates (Step S2 of FIG. 2). In Step S2, the training data candidate clustering unit 21 transfers the clustering results to the training data generation unit 22.

Although it is sufficient to use publicly-known algorithms for clustering, processing is performed by adjusting the parameters such that the distribution of the labels within each cluster is skewed. An example of clustering results obtained by such processing is shown in FIG. 5. FIG. 5 is diagram illustrating a specific example of processing results generated by the training data candidate clustering unit 21 shown in FIG. 1. Referring now to FIG. 5, in FIG. 5, the training data candidates are divided into n clusters. In the example of FIG. 5, the percentages of the labels in cluster 1 are 80% for personal names, 10% for place names, and 10% for UNKNOWN.

Finally, the training data generation unit 22 receives the clustering results of the training data candidate clustering unit 21 and, by taking into account the distribution of the labels in each cluster, generates training data from clusters containing specified labels in a given or higher percentage (Step S3 of FIG. 2). The generated training data is stored by the training data storage unit 12.

Here, explanations will be provided regarding an example, in which the training data generation unit 22 generates training data using the clustering results shown in FIG. 5. In Embodiment 1, it is assumed that the training data is generated from clusters containing, for instance, 70% or more of a single class.

In FIG. 5, personal names occupy 70% or more of cluster 1 and "personal name" is determined to be reliable. On the other hand, "place name" and "UNKNOWN" included in cluster 1 are determined to be unreliable and they are removed from cluster 1. Similarly, since place names occupy 70% or more of cluster 2, "place name" is determined to be reliable. In cluster 2, personal names and UNKNOWN are determined to be unreliable and are removed. Since UNKNOWN exceeds 70% in cluster n, it is determined that only non-characteristic expressions are included. In addition, in cluster n, personal names and place names are determined to be unreliable and are removed.

Upon execution of Step S3, the training data generation unit 22 pools the remaining training data candidates and uses them as training data. Referring to FIG. 5 as an example, "Tsuchida" in cluster 1, which is an annotation omission, is deleted. In the same way, "Fukushima" in cluster 2, which is an annotation error, is also deleted. In this manner, correct training data is generated by executing Steps S1-S3.

As described above, in Embodiment 1, training data candidates are created based on annotation information using an imperfect ground truth corpus that can be created at low cost. The training data candidates are then clustered and annotation errors and annotation omissions representing inadequate training data candidates are detected using the distribution of the class labels of the training data candidates within the clusters. Training data is then generated by removing the detected inadequate training data candidates. Accordingly, Embodiment 1 makes it possible to create correct training data for characteristic expression extraction at low cost.

Embodiment 2

Figure 6:
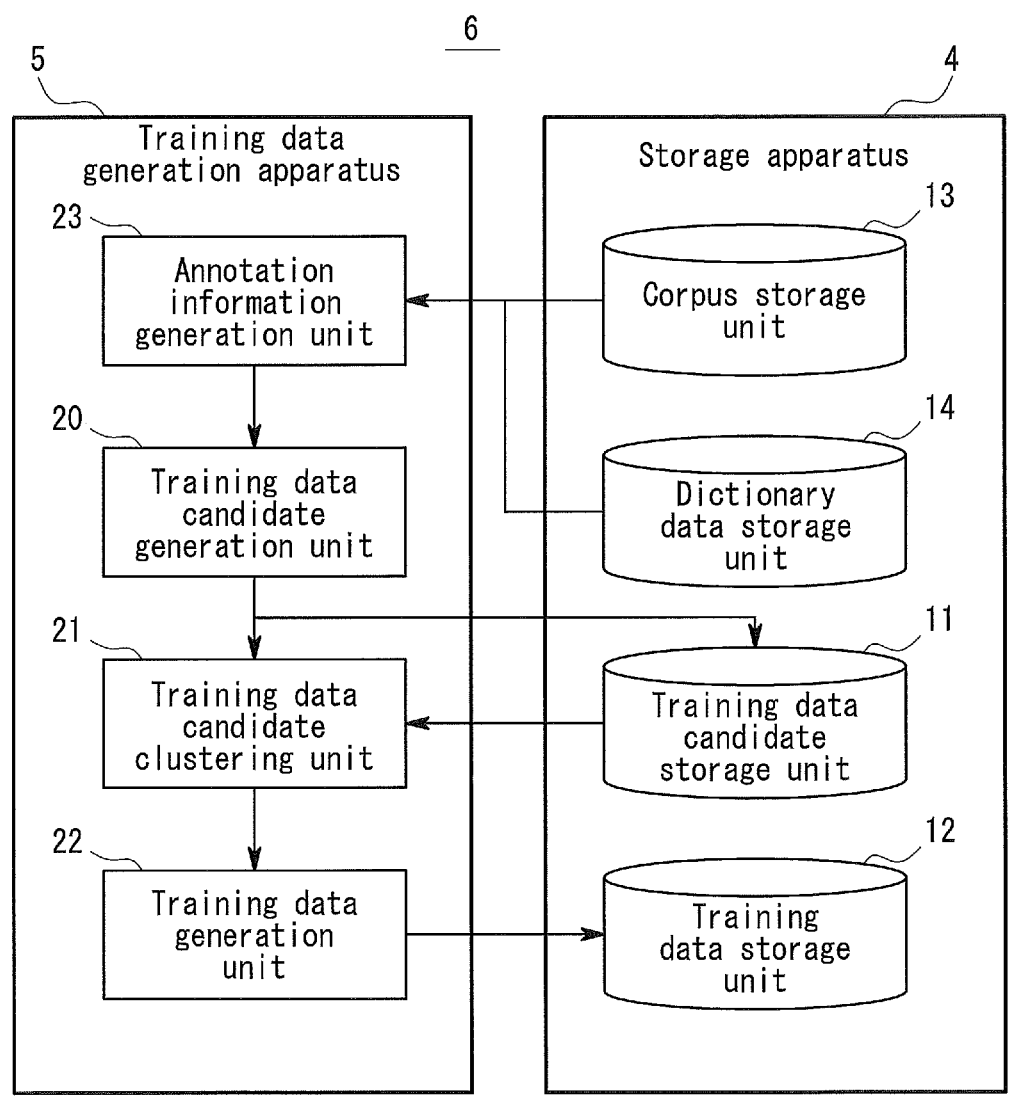
FIG. 6 is a block diagram illustrating the configuration of the training data generation apparatus used in Embodiment 2 of the present invention.

Next, the training data generation apparatus and training data generation method used in Embodiment 2 of the present invention will be described with reference to FIG. 6 and FIG. 7. First of all, the configuration of the training data generation apparatus used in Embodiment 2 will be described with reference to FIG. 6 and FIG. 7. FIG. 6 is a block diagram illustrating the configuration of the training data generation apparatus used in Embodiment 2 of the present invention. FIG. 7 is diagram illustrating a specific example of dictionary data stored in the dictionary data storage unit shown in FIG. 6.

As shown in FIG. 6, in Embodiment 2 of the present invention, the training data generation system 6, as opposed to Embodiment 1, includes a storage apparatus 4 and a training data generation apparatus 5. In Embodiment 2, the storage apparatus 4, as opposed to the storage apparatus 1 shown in FIG. 1 in Embodiment 1, includes a corpus storage unit 13 and a dictionary data storage unit 14 instead of the incomplete ground truth corpus storage unit 10. The corpus storage unit 13 stores a corpus that has no annotation information. The dictionary data storage unit 14 stores a dictionary that has registered therein characteristic expressions and their classes. Except for the points described above, the storage apparatus 4 is configured similarly to the storage apparatus 1 shown in FIG. 1.

In addition, as shown in FIG. 6, the training data generation apparatus 5 used in Embodiment 2 of the present invention, as opposed the training data generation apparatus 2 shown in FIG. 1 in Embodiment 1, further includes an annotation information generation unit 23. The annotation information generation unit 23 generates annotation information. Except for the points described above, the training data generation apparatus 5 is configured similarly to the training data generation apparatus 2 shown in FIG. 1. Below, the differences between Embodiment 2 and Embodiment 1 will be described in specific detail.

In Embodiment 2, the corpus storage unit 13 stores text data. The text data table shown in FIG. 3 ($a$) is suggested as an example of the text data stored by the corpus storage unit 13. The corpus storage unit 13 stores only the text data table.

As shown in FIG. 7, the dictionary data storage unit 14 stores a dictionary (dictionary data) that has registered therein characteristic expressions and their classes. As shown in FIG. 7, "Fukushima" and "Yamada" are registered in the dictionary data as personal names. In addition, "Osaka" and "Nara" are registered as place names.

First of all, the annotation information generation unit 23 reads out text data from the corpus storage unit 13 and reads out dictionary data from the dictionary data storage unit 14. The annotation information generation unit 23 then compares the multiple characteristic expressions registered in the dictionary data and the text data stored in the corpus storage unit 13 and searches the text data for the character strings of the characteristic expressions registered in the dictionary.

Furthermore, the annotation information generation unit 23 identifies the position of the locations of occurrence of the characteristic expressions and the classes of these characteristic expressions by character string matching and creates annotation information based on the above. The annotation information is transferred to the training data candidate generation unit 20. Since the annotation information corresponds to the annotation table shown in FIG. 3 ($b$), the annotation information generation unit 23 can be said to possess functionality for creating an incomplete ground truth corpus.

Figure 8:
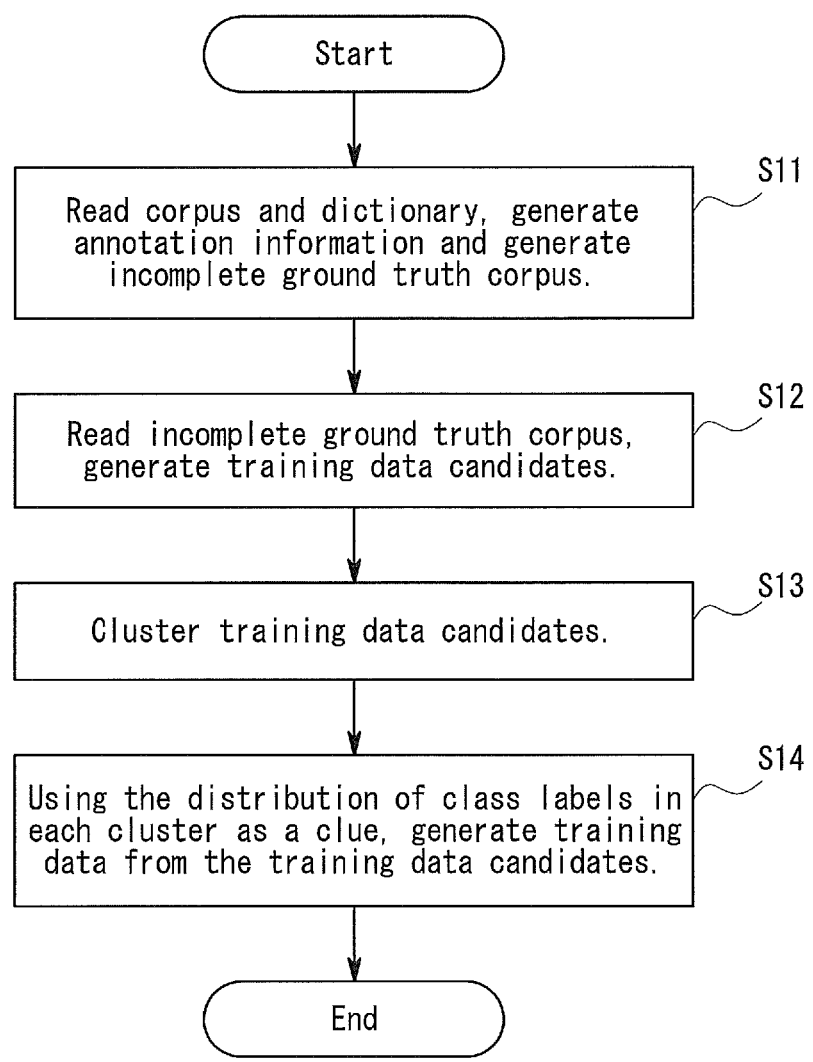
FIG. 8 is a flow chart illustrating the operation of the training data generation apparatus used in Embodiment 2 of the present invention.

Next, the operation of the training data generation apparatus 5 used in Embodiment 2 of the present invention will be described with reference to FIG. 8. FIG. 8 is a flow chart illustrating the operation of the training data generation apparatus used in Embodiment 2 of the present invention. It should be noted that, in Embodiment 2, the training data generation method can also be implemented by operating the training data generation apparatus 5 shown in FIG. 6. Accordingly, the following description of the operation of the training data generation apparatus 5 is substituted for the description of the training data generation method used in Embodiment 2. In addition, in the description that follows, refer to FIG. 6 as appropriate.

As shown in FIG. 8, first of all, the annotation information generation unit 23 reads out text data from the corpus storage unit 13 and dictionary data storage unit 14 and generates annotation information for the locations where characteristic expressions registered in the dictionary data appear in the corpus (Step S11 in FIG. 8). Upon execution of Step S11, the annotation information generation unit 23 transfers the corpus stored in the corpus storage unit 13 and the annotation information to the training data candidate generation unit 20 as incomplete ground truth corpus data.

Subsequently, the training data candidate generation unit 20 generates training data candidates from the incomplete ground truth corpus data created in Step S11 (Step S12 in FIG. 8). Clustering by the training data candidate clustering unit 21 (Step S13 in FIG. 8) and training data generation by the training data generation unit 22 (Step S14 in FIG. 8) are performed next. It should be noted that Steps S12-S14 are similar to Steps S1-S3 shown in FIG. 2 in Embodiment 1.

Thus, in Embodiment 2 of the present invention, an incomplete ground truth corpus is created automatically using a corpus and a dictionary. Accordingly, if a dictionary is available, the incomplete ground truth corpus doesn't have to be created manually and the costs involved in the creation of the incomplete ground truth corpus can be reduced. In accordance with Embodiment 2, training data generation can be accomplished at a lower cost than in Embodiment 1.

Embodiment 3

Figure 9:
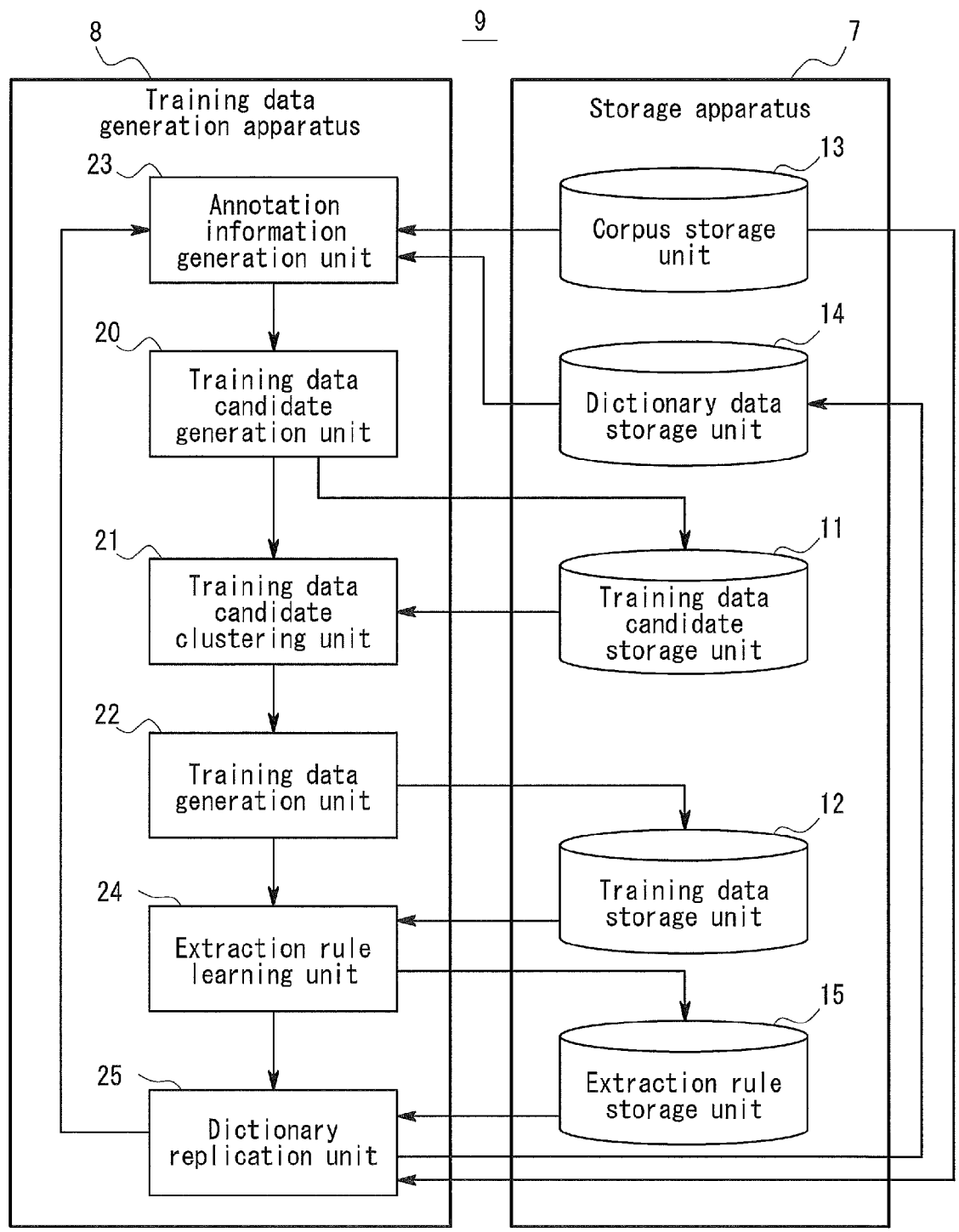
FIG. 9 is a block diagram illustrating the configuration of the training data generation apparatus used in Embodiment 3 of the present invention.

Next, the training data generation apparatus and training data generation method used in Embodiment 3 of the present invention will be described with reference to FIG. 9 and FIG. 10. First of all, the configuration of the training data generation apparatus used in Embodiment 3 will be described with reference to FIG. 9. FIG. 9 is a block diagram illustrating the configuration of the training data generation apparatus used in Embodiment 3 of the present invention.

As shown in FIG. 9, in Embodiment 3 of the present invention, the training data generation system 9, as opposed to Embodiments 1 and 2, includes a storage apparatus 7 and a training data generation apparatus 8. Further, in Embodiment 3, in addition to the configuration of the storage apparatus 4 shown in FIG. 6 in Embodiment 2, the storage apparatus 7 includes an extraction rule storage unit 15. Also, in addition to the configuration of the training data generation apparatus 5 shown in FIG. 6 in Embodiment 2, the training data generation apparatus 8 includes an extraction rule learning unit 24 and a dictionary replication unit 25. Below, the differences between Embodiment 3 and Embodiment 2 will be described in specific detail.

The extraction rule learning unit 24 learns characteristic expression extraction rules used for extracting characteristic expressions using the training data generated by the training data generation unit 22. In Embodiment 3, the extraction rule learning unit 24 reads out training data from the training data storage unit 12, learns characteristic expression extraction rules using any available extraction rule learning techniques, and outputs the results to the extraction rule storage unit 15. The extraction rule storage unit 15 stores the characteristic expression extraction rules learned by the extraction rule learning unit 24.

The dictionary replication unit 25 extracts characteristic expressions from a corpus containing multiple documents using the extraction rules learned by the extraction rule learning unit 24. The dictionary replication unit 25 then adds and registers characteristic expressions that satisfy a preset condition among the extracted characteristic expressions, along with class information identifying their classes, in the dictionary stored by the dictionary data storage unit 14.

In Embodiment 3, the dictionary replication unit 25 reads out data from the corpus storage unit 13 and extraction rule storage unit 15, respectively, and extracts characteristic expressions from the text data of the corpus stored in the corpus storage unit 13. In addition, the dictionary replication unit 25 obtains the confidence levels of the extracted characteristic expressions and stores characteristic expressions whose confidence levels exceed a threshold value, several expressions with the highest confidence levels, or several dozen expressions with the highest confidence levels, in the dictionary data storage unit 14 along with their class information.

The absolute number of times said characteristic expressions have been extracted, or the percentage of the number of occurrences of said characteristic expressions relative to the number of occurrences of all the characteristic expressions, can be used as the "confidence levels" in Embodiment 3. In addition, when reliability levels are assigned to the extraction rules, the dictionary replication unit 25 can calculate the confidence levels using the reliability levels of the extraction rules.

It should be noted that the threshold values serving as criteria for storage in the dictionary data storage unit 14 should be appropriately configured in accordance with the degree of annotation errors and annotation omissions among the training data candidates generated by the annotation information generation unit 23.

Next, the operation of the training data generation apparatus 8 used in Embodiment 3 of the present invention will be described with reference to FIG. 10. FIG. 10 is a flow chart illustrating the operation of the training data generation apparatus used in Embodiment 3 of the present invention. It should be noted that, in Embodiment 3, the training data generation method can also be implemented by operating the training data generation apparatus 8 shown in FIG. 9. Accordingly, the following description of the operation of the training data generation apparatus 8 is substituted for the description of the training data generation method used in Embodiment 3. In addition, in the description that follows, refer to FIG. 9 as appropriate.

Figure 10:
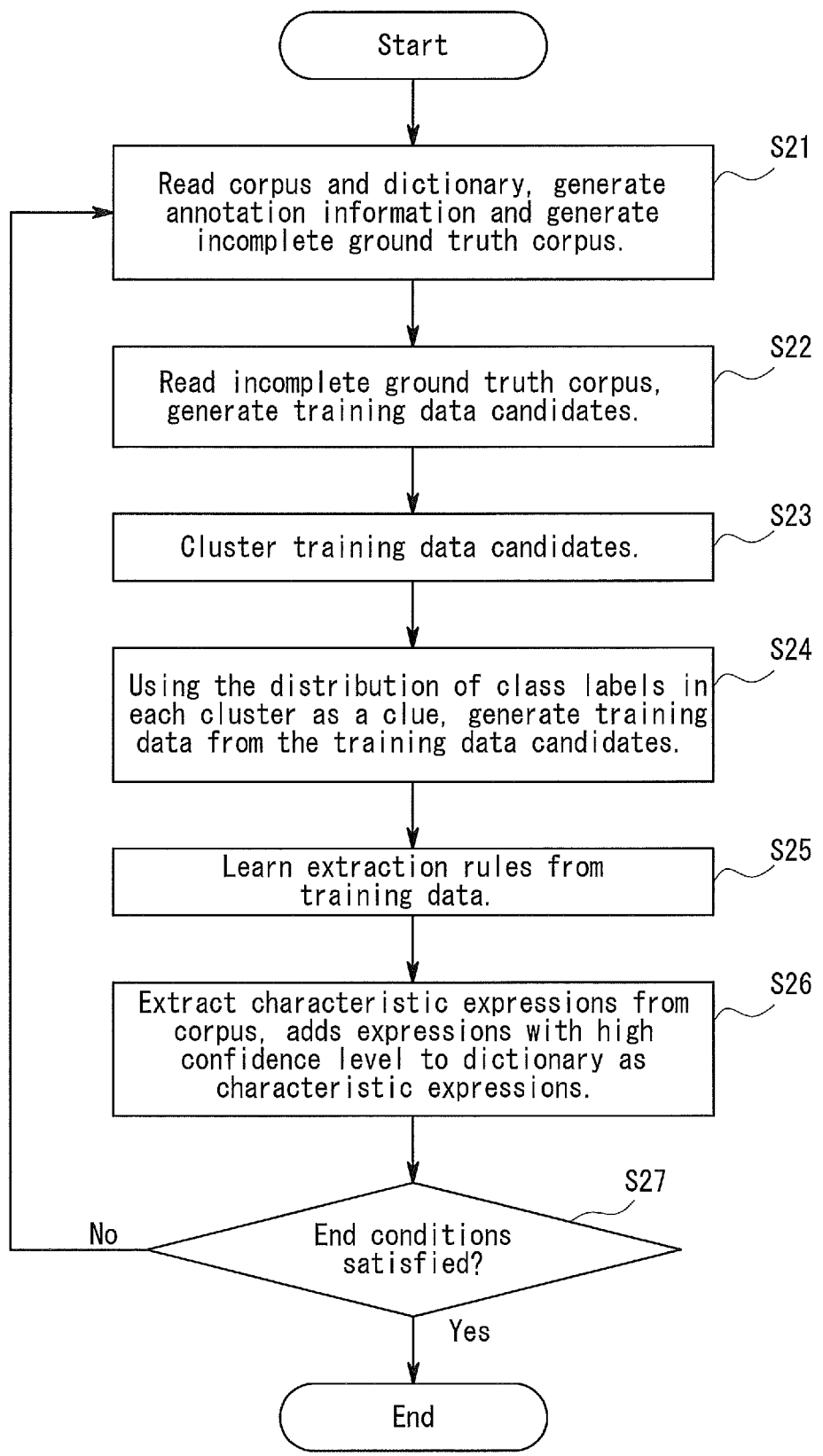
FIG. 10 is a flow chart illustrating the operation of the training data generation apparatus used in Embodiment 3 of the present invention.

As shown in FIG. 10, first of all, the annotation information generation unit 23 generates incomplete ground truth corpus data (Step S21 in FIG. 10). Subsequently, the training data candidate generation unit 20 generates training data candidates from the incomplete ground truth corpus data created in Step S21 (Step S22 in FIG. 10). Clustering by the training data candidate clustering unit 21 (Step S23 in FIG. 10) and training data generation by the training data generation unit 22 (Step S24 in FIG. 10) are performed next. It should be noted that Steps S21-S24 are similar to Steps S11-S14 shown in FIG. 8 in Embodiment 2.

Next, upon execution of Step S24, the extraction rule learning unit 24 reads out training data from the training data storage unit 12 and learns characteristic expression extraction rules using any available extraction rule learning techniques (Step S25 in FIG. 10). In Step S25, the extraction rule learning unit 24 stores the generated extraction rules in the extraction rule storage unit 15.

Next, the dictionary replication unit 25 reads out the characteristic expression extraction rules from the extraction rule storage unit 15 and reads out text data from the corpus. The dictionary replication unit 25 then uses them to extract characteristic expressions from the corpus and supplies the characteristic expressions whose confidence levels exceed a threshold value among the extracted characteristic expressions to the dictionary data storage unit 14 along with their class information (Step S26 in FIG. 10).

After that, the dictionary replication unit 25 makes a determination as to whether the end conditions have been met (S27 in FIG. 10). If as a result of such a determination it is established that the end conditions have not been met, Step S1 is executed once again. On the other hand, if as a result of such a determination it is established that the end conditions have been met, the operation of the system is terminated. It should be noted that the number of executions in Steps S21-S27 (end if repeated a specified number of times) and the number of words added to the dictionary (end if the number of the added words exceeds a preset value) are suggested as the end conditions. Additionally, operation may be terminated if not a single characteristic expression has been added.

An explanation of the term "confidence level", as used in Embodiment 3, is provided below. In Embodiment 3, the confidence level can be expressed, for example, by the scores listed below. The confidence level is calculated such that it is increased as the following two conditions are met: class c is the correct class for characteristic expression w, and characteristic expression w is not used with classes other than class c in the corpus. Specifically, the confidence level (w, c) is calculated using (Eq. 1) and (Eq. 2) below.

$$\text{Confidence level}(w,c) = \text{ext\_cnt}(w,c) * (\Sigma\_xf(x,c))/|D(w)| \quad \text{(Eq. 1)}$$

$$f(x,c) = fc(x)/\Sigma\_cifci(x) \quad \text{(Eq. 2)}$$

In (Eq. 1) above, "ext_cnt (w, c)" represents the number of extracted characteristic expressions w of class c. "D (w)" represents a set of training data, in which the characteristic expressions w appear in the corpus. The symbol "x" represents a single training data element containing a characteristic expression w. The expression "fci (x)" represents the reliability level assigned to an extraction rule used to determine whether or not "x" belongs to class ci. The expression "fc (x)" represents the reliability level assigned to an extraction rule used to determine whether or not "x" belongs to class c.

Namely, since ext_cnt (w, c) represents the number of times the characteristic expression w of class c has been extracted, the higher it is, the more correct it is to view characteristic expressions was a characteristic expression of that class c. In addition, ($\Sigma$_x f (x, c))/|D (w)| increases when the characteristic expressions w typically occur in class c. Accordingly, the confidence level (w, c) increases when it is correct to view characteristic expressions was characteristic expressions of class c, and, in addition, when the possibility of them being used as characteristic expressions of other classes is low.

For example, the confidence level regarding whether the characteristic expression "Saitoh" belongs to the class "personal names" is calculated as follows. First of all, as a prerequisite, it is assumed that the labels "personal name", "place name", and "UNKNOWN" are included in the class information.

In addition, it is assumed that the characteristic expression "Saito" occurs three times in the corpus storage unit and the reliability levels of the respective extraction rules are as shown below. It should be noted that, in the following, the fact that the reliability level of an extraction rule is 0 indicates that there were no matches with the extraction rule.
First location/"Personal name" rule: 0.6, "Place name" rule: 0
Second location/"Personal name" rule: 0.6, "Place name" rule: 0
Third location/"Personal name" rule: 0.5, "Place name" rule: 0.8

Accordingly, since the number of characteristic expressions "Saitoh" extracted in the class "personal name" is 3, ext_cnt (Saitoh, personal name)=3. In addition, since the frequency of occurrence in the corpus information storage unit is 3, |D (W)| is 3. Accordingly, the confidence level is calculated using (Eq. 1) and (Eq. 2) above in the following manner.

$$\text{Confidence level}(\text{Saitoh, personal name}) = \text{ext\_cnt}(\text{Saitoh, personal name}) * (\Sigma\_xf(x, \text{personal name}))/|D(\text{Saito})| = 3*(0.6/(0.6+0)+0.6/(0.6+0)+0.5/(0.5+0.8))/3 = 2.38$$

In the same manner, the confidence level regarding whether the characteristic expression "Fukuoka" belongs to the class "personal names" is calculated as follows. First of all, it is assumed that the characteristic expression "Fukuoka" occurs three times in the corpus storage unit and the reliability levels of the respective extraction rules are as shown below.
First location/"Personal name" rule: 0.6, "Place name" rule: 0.6,
Second location/"Personal name" rule: 0.6, "Place name" rule: 0.6,
Third location/"Personal name" rule: 0.5, "Place name" rule: 0.8

Accordingly, in this case the confidence level is also calculated using (Eq. 1) and (Eq. 2) above in the following manner.

$$\text{Confidence level}(\text{Fukuoka, personal name}) = \text{ext\_cnt}(\text{Fukuoka, personal name}) * (\Sigma\_xf(x, \text{personal name}))/|D(\text{Fukuoka})| = 3*(0.6/(0.6+0.6)+0.6/(0.6+0.6)+0.5/(0.5+0.8))/3 = 1.38$$

As can be seen from the above-described results, a higher confidence level is computed for the characteristic expression "Saitoh" because it is more frequently used only as a personal name. On the other hand, a lower confidence level is computed for the characteristic expression "Fukuoka" because it is more frequently used either as a personal name or as a place name.

Thus, in Embodiment 3, characteristic expressions are extracted from the corpus using characteristic expression extraction rules obtained from the generated training data and reliable characteristic expressions are added to the dictionary. The creation of incomplete ground truth data from the corpus is then performed using the dictionary, to which the characteristic expressions are added. Furthermore, the addition of the characteristic expressions to the dictionary and the generation of the incomplete ground truth data can be repeated.

Accordingly, in Embodiment 3, initially, the dictionary used to create the incomplete ground truth corpus may be small in size; later, however, its size can be increased. In accordance with Embodiment 3, training data can be created even if only a small-sized dictionary is available. For this reason, it becomes possible to create training data at a lower cost than in Embodiments 1 and 2.

(Characteristic Expression Extraction System)

Figure 11:
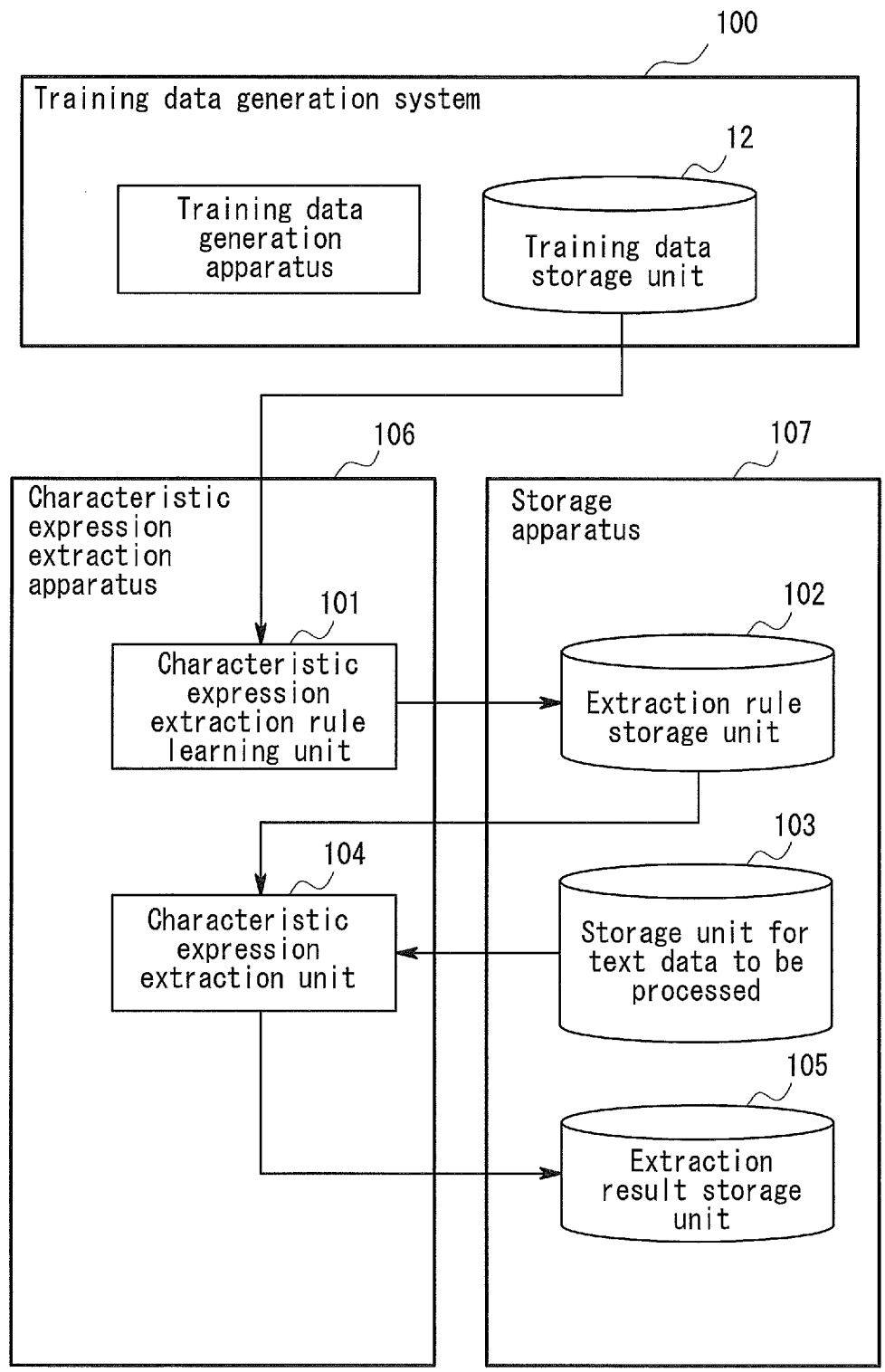
FIG. 11 is a block diagram illustrating the configuration of a characteristic expression extraction system used in an embodiment of the present invention.

Next, a characteristic expression extraction system used in an embodiment of the present invention will be explained with reference to FIG. 11. FIG. 11 is a block diagram illustrating the configuration of a characteristic expression extraction system used in an embodiment of the present invention.

The characteristic expression extraction system shown in FIG. 11 is a system that incorporates the training data generation apparatus described in Embodiment 1-Embodiment 3 as one of its components. As shown in FIG. 11, the characteristic expression extraction system includes a training data generation system 100, a characteristic expression extraction apparatus 106, and a storage apparatus 107. The training data generation system 100 is the training data generation system shown in any one of Embodiments 1-3.

In addition, the characteristic expression extraction apparatus 106 includes a characteristic expression extraction rule learning unit 101 and a characteristic expression extraction unit 104. The storage apparatus 107 includes an extraction rule storage unit 102, a storage unit for text data to be processed 103, and an extraction result storage unit 105.

The characteristic expression extraction rule learning unit 101 reads training data from the training data storage unit 12 provided in the training data generation system 100 and learns characteristic expression extraction rules used for extracting characteristic expressions. The characteristic expression extraction rule learning unit 101 possesses functionality that is similar to that of the extraction rule learning unit 24 shown in FIG. 9 in Embodiment 3. The learned characteristic expression extraction rules are stored in the extraction rule storage unit 102.

The characteristic expression extraction unit 104 extracts characteristic expressions from the text data stored in the storage unit for text data to be processed 103 using the characteristic expression extraction rules read from the extraction rule storage unit 102. In addition, the characteristic expression extraction unit 104 stores the extracted characteristic expressions in the extraction result storage unit 105. It should be noted that the storage unit for text data to be processed 103 stores a corpus containing multiple documents to be processed.

Thus, the characteristic expression extraction system used in this embodiment includes the inventive training data generation system. Accordingly, since the characteristic expression extraction rules can be learned from training data created at low cost, the cost involved in building a characteristic expression extraction system can be reduced.

Figure 12:
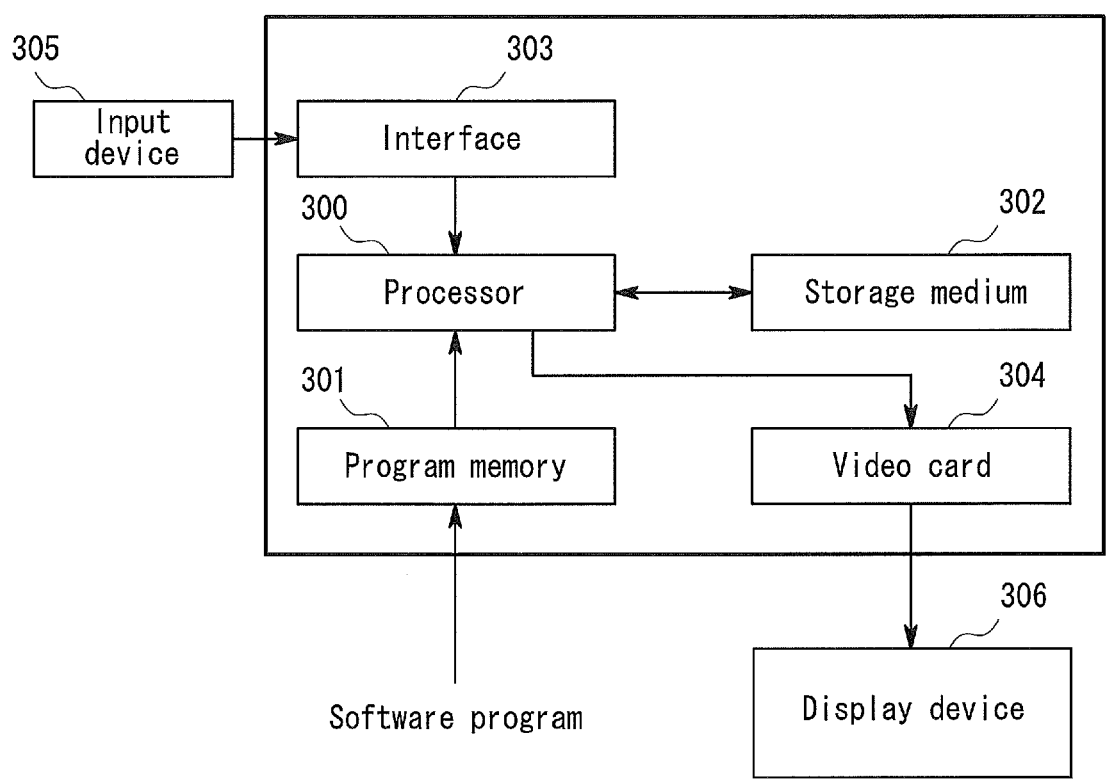
FIG. 12 is a block diagram illustrating a computer capable of executing the software program used in any one of Embodiments 1-3 of the present invention.

In addition, while the descriptions above focused on the training data generation apparatus and training data generation method used in Embodiments 1-3 of the present invention, the present invention can also be implemented in the form of a computer software program. An explanation of the term "software program", as used in Embodiments 1-3, is provided below. FIG. 12 is a block diagram illustrating a computer capable of executing the software program used in any one of Embodiments 1-3 of the present invention.

The computer shown in FIG. 12 operates as an information processing system implementing the training data generation apparatus according to the present invention. As shown in FIG. 12, the computer (information processing system) includes a processor 300, a program memory 301, a storage medium 302, an interface 303 connected to peripheral devices, and a video card 304 used for outputting display data. RAM, various other types of memory, Magnetic storage media such as hard disks, etc., can be used as the storage medium 302. It should be noted that an input device 305, such as a keyboard, etc., and a display device 306, such as a liquid crystal display device and the like, are connected to the computer.

A software program used to operate the processor 300 is stored in the program memory 301. The software program may be supplied recorded on computer-readable storage media. In addition, the software program may be provided via a network, etc. Optical disks, magnetic disks, magneto-optical disks, semiconductor memory, floppy disks, and the like are suggested as examples of the computer-readable storage media.

The software program stored in the program memory 301 contains instructions for executing the processing steps shown in any one of Embodiments 1~3. In other words, for example, a software program that includes instructions directing the processor 300 to effect Steps S1~S3 shown in FIG. 2 is stored in the program memory 301. The training data generation apparatus 2 used in Embodiment 1 is implemented if this software program is executed. In such a case, the processor 300 operates as the training data candidate generation unit 20, training data candidate clustering unit 21, and training data generation unit 22, while the storage medium 302 operates as the storage apparatus 1.

In addition, in a similar manner, a software program that includes instructions directing the processor 300 to execute Steps S11~S14 shown in FIG. 8 is stored in the program memory 301. The training data generation apparatus 5 used in Embodiment 2 is implemented if this software program is executed. In such a case, the processor 300 operates as the training data candidate generation unit 20, training data candidate clustering unit 21, training data generation unit 22, and annotation information generation unit 23. The storage medium 302 operates as the storage apparatus 4.

Furthermore, in a similar manner, a software program that includes instructions directing the processor 300 to execute Steps S21~S27 shown in FIG. 10 is stored in the program memory 301. The training data generation apparatus 8 used in Embodiment 3 is implemented if this software program is executed. In such a case, the processor 300 operates as the training data candidate generation unit 20, training data candidate clustering unit 21, training data generation unit 22, annotation information generation unit 23, extraction rule learning unit 24, and dictionary replication unit 25. The storage medium 302 operates as the storage apparatus 7. It should be mentioned that, in Embodiments 1~3, storage media in another external computer may operate as the storage apparatuses 1, 4, and 7.

Although the invention of the present application was described above with reference to embodiments, the invention of the present application is not limited to the above-described embodiments. The configuration and details of the invention of the present application admit of various modifications that can be appreciated by those skilled in the art within the scope of the invention of the present application.

This application claims the benefits of Japanese Patent Application 2009-099183 filed on Apr. 15, 2009, which is incorporated herein by reference.

The training data generation apparatus, characteristic expression extraction system, training data generation method, and computer-readable storage medium according to the invention of the present application have the following features.

(1) A training data generation apparatus that generates training data used for creating characteristic expression extraction rules, comprising:

a training data candidate clustering unit that clusters multiple training data candidates assigned labels indicating annotation classes based on feature values containing respective context information, and a training data generation unit that, by referring to each cluster obtained using the clustering results, obtains the distribution of the labels of the training data candidates within the cluster, identifies training data candidates that meet a preset condition based on the obtained distribution, and generates training data using the identified training data candidates.

(2) The training data generation apparatus according to (1) above, wherein the training data generation unit uses training data candidates assigned a specified label in the cluster containing the specified label at or above a predetermined percentage as training data having said specified labels.

(3) The training data generation apparatus according to (2) above, wherein the training data generation unit deletes training data candidates that are not assigned the specified label in the cluster containing the specified label at or above a predetermined percentage from the entire set of the training data candidates.

(4) The training data generation apparatus according to (2) above, wherein the training data generation unit, obtains the degree of cluster membership for training data candidates that are not assigned the specified label in the cluster containing the specified label at or above a predetermined percentage, uses the training data candidates for which the obtained degree is not lower than a threshold value as training data, and deletes training data candidates for which the obtained degree is less than the threshold value from the entire set of the training data candidates.

(5) The training data generation apparatus according to (4) above, wherein the training data generation unit uses one or more of the following criteria as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

(6) The training data generation apparatus according to (1) above, wherein the training data candidate clustering unit configures the clustering condition such that one or more conditions are met during clustering among the following conditions: the distribution of the labels within each cluster varies between the clusters, there is a label with the highest percentage within each cluster, the number of training data candidates within each cluster exceeds a specified number, and the number of clusters is less than a specified number.

(7) The training data generation apparatus according to (1) above, wherein the training data generation unit appends new feature values to training data candidates used as the training data.

(8) The training data generation apparatus according to (1) above, further comprising a training data candidate generation unit, wherein the training data candidate generation unit uses text data and annotation information assigned to each word contained in the text data to detect a feature value containing context information for every word string or word from multiple words obtained by segmenting the text data and generates the training data candidates by appending the feature value to each word or each word string.

(9) The training data generation apparatus according to (8) above, further comprising:

an annotation information generation unit creating the annotation information, and a dictionary having registered therein multiple characteristic expressions and the respective classes of the multiple characteristic expressions, wherein the annotation information generation unit compares the multiple characteristic expressions registered in the dictionary with the text data, identifies the locations of occurrence where any of the multiple characteristic expressions from the text data appear, and creates annotation information that identifies the position of the locations of occurrence and the classes of the characteristic expressions that appear.

(10) The training data generation apparatus according to (9) above, further comprising an extraction rule learning unit and a dictionary replication unit, wherein the extraction rule learning unit learns characteristic expression extraction rules used to extract the characteristic expressions using the training data generated by the training data generation unit, and the dictionary replication unit extracts characteristic expressions from a corpus containing multiple documents using extraction rules learned by the extraction rule learning unit and adds and registers characteristic expressions that meet a preset condition among the extracted characteristic expressions, along with class information that identifies their classes, in the dictionary.

(11) A characteristic expression extraction system comprising training data generation apparatus that generates training data used for creating characteristic expression extraction rules and a characteristic expression extraction apparatus, wherein the training data generation apparatus comprises:

a training data candidate clustering unit that clusters multiple training data candidates assigned labels indicating annotation classes based on feature values containing respective context information, and a training data generation unit that, by referring to each cluster obtained using the clustering results, obtains the distribution of the labels of the training data candidates within the cluster, and, based on the obtained distribution, identifies training data candidates that meet a preset condition, and generates training data using the identified training data candidates, and the characteristic expression extraction apparatus learns characteristic expression extraction rules used to extract characteristic expressions using the training data generated by the training data apparatus and extracts the characteristic expressions from a corpus containing multiple documents using the learned characteristic expression extraction rules.

(12) A training data generation method used for generating training data utilized in the creation of characteristic expression extraction rules, the method comprising the steps of:

(a) clustering multiple training data candidates assigned labels indicating annotation classes based on feature values containing respective context information, and (b) by referring to each cluster obtained using the clustering results in Step (a), obtaining the distribution of the labels of the training data candidates within the cluster, identifying training data candidates that meet a preset condition based on the obtained distribution, and generating training data using the identified training data candidates.

(13) The training data generation method according to (12) above, wherein in Step (b), the training data candidates assigned a specified label in the cluster containing the specified label at or above a predetermined percentage are used as the training data having the specified label.

(14) The training data generation method according to (13) above, wherein in Step (b), the training data candidates that are not assigned the specified label in the cluster containing the specified label at or above a predetermined percentage are deleted from the entire set of the training data candidates.

(15) The training data generation method according to (13) above, wherein in Step (b), the degree of cluster membership is obtained for training data candidates that are not assigned the specified label in the cluster containing the specified label at or above a predetermined percentage, and the training data candidates for which the obtained degree is not lower than a threshold value are used as training data, while the training data candidates for which the obtained degree is less than the threshold value are deleted from the entire set of training data candidates.

(16) The training data generation method according to (15) above, wherein in Step (b), one or more of the following criteria are used as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

(17) The training data generation method according to (12) above, wherein in Step (a), during clustering, the clustering condition is configured such that one or more conditions are met among the following conditions: the distribution of the labels within each cluster varies between the clusters, there is a label with the highest percentage within each cluster, the number of training data candidates within each cluster exceeds a specified number, and the number of clusters is less than a specified number.

(18) The training data generation method according to (12) above, wherein in Step (b), a new feature value is appended to the training data candidates used as the training data.

(19) The training data generation method according to (12) above, further comprising the step of (c) using text data and annotation information assigned to each word contained in the text data to detect a feature value containing context information for every word string or word from multiple words obtained by segmenting the text data and generating training data candidates by appending the feature value to each word or each word string.

(20) The training data generation method according to (19) above, further comprising the step of (d) using a dictionary having registered therein multiple characteristic expressions and the respective classes of the plurality of characteristic expressions to compare the plurality of characteristic expressions registered in the dictionary with the text data, identifying the locations of occurrence where any of the plurality of characteristic expressions from the text data appear, and creating annotation information that identifies the position of the locations of occurrence and the classes of the characteristic expressions that appear.

(21) The training data generation method according to (20) above, further comprising the steps of:

(e) learning characteristic expression extraction rules used to extract the characteristic expressions using the training data generated in Step (b), and (d) extracting characteristic expressions from a corpus containing multiple documents using extraction rules learned in Step (e) and adding and registering characteristic expressions that meet a preset condition among the extracted characteristic expressions, along with class information that identifies their classes, in the dictionary

(22) A computer-readable storage medium having recorded thereon a software program utilized by a computer in the generation of training data used for creating characteristic expression extraction rules, the software program containing instructions that direct the computer to perform the steps of:

(a) clustering multiple training data candidates assigned labels indicating annotation classes based on feature values containing respective context information, and (b) by referring to each cluster obtained using the clustering results in Step (a), obtaining the distribution of the labels of the training data candidates within the cluster, identifying training data candidates that meet a preset condition based on the obtained distributions, and generating training data using the identified training data candidates.

(23) The computer-readable storage medium according to (22) above, wherein in Step (b), the training data candidates assigned a specified label in the cluster containing the specified label at or above a predetermined percentage are used as the training data having the specified label.

(24) The computer-readable storage medium according to (23) above, wherein in Step (b), the training data candidates that are not assigned the specified label in the cluster containing the specified label at or above a predetermined percentage are deleted from the entire set of the training data candidates.

(25) The computer-readable storage medium according to (23) above, wherein in Step (b), the degree of cluster membership is obtained for training data candidates that are not assigned the specified label in the cluster containing the specified label at or above a predetermined percentage, and the training data candidates for which the obtained degree is not lower than a threshold value are used as training data, while the training data candidates for which the obtained degree is less than the threshold value are deleted from the entire set of training data candidates.

(26) The computer-readable storage medium according to (25) above, wherein in Step (b), one or more of the following criteria are used as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

(27) The computer-readable storage medium according to (22) above, wherein in Step (a), during clustering, the clustering condition is configured such that one or more conditions are met among the following conditions: the distribution of the labels within each cluster varies between the clusters, there is a label with the highest percentage within each cluster, the number of training data candidates within each cluster exceeds a specified number, and the number of clusters is less than a specified number.

(28) The computer-readable storage medium according to (22) above, wherein in Step (b), a new feature value is appended to the training data candidates used as the training data.

(29) The computer-readable storage medium according to (22) above, the software program further comprising instructions that direct the computer to execute the step of (c) using text data and annotation information assigned to each word contained in the text data to detect a feature value containing context information for every word string or word from multiple words obtained by segmenting the text data and generating training data candidates by appending the feature value to each word or each word string.

(30) The computer-readable storage medium according to (29) above, the software program further comprising instructions that direct the computer to execute the step of (d) using a dictionary having registered therein multiple characteristic expressions and the respective classes of the plurality of characteristic expressions to compare the plurality of characteristic expressions registered in the dictionary with the text data, identifying the locations of occurrence where any of the plurality of characteristic expressions from the text data appear, and creating annotation information that identifies the position of the locations of occurrence and the classes of the characteristic expressions that appear.

(31) The computer-readable storage medium according to (30) above, the software program further comprising instructions that direct the computer to execute the steps of (e) learning characteristic expression extraction rules used to extract the characteristic expressions using the training data generated in Step (b), and (d) extracting characteristic expressions from a corpus containing multiple documents using extraction rules learned in Step (e) and adding and registering characteristic expressions that meet a preset condition among the extracted characteristic expressions, along with the class information that identifies their classes, in the dictionary.

INDUSTRIAL APPLICABILITY

The present invention makes it possible to create characteristic expression extraction rules at low cost. For this reason, the present invention is useful in systems intended for efficient use of textual information, such as information retrieval systems, text mining systems, and the like. The present invention possesses industrial applicability.

DESCRIPTION OF REFERENCE NUMERALS

1 Storage apparatus (Embodiment 1)
2 Training data generation apparatus (Embodiment 1)
3 Training data generation system (Embodiment 1)
4 Storage apparatus (Embodiment 2)
5 Training data generation apparatus (Embodiment 2)
6 Training data generation system (Embodiment 2)
7 Storage apparatus (Embodiment 3)
8 Training data generation apparatus (Embodiment 3)
9 Training data generation system (Embodiment 3)
10 Incomplete ground truth corpus storage unit
11 Training data candidate storage unit
12 Training data storage unit
13 Corpus storage unit
14 Dictionary data storage unit
15 Extraction rule storage unit
20 Training data candidate generation unit
21 Training data candidate clustering unit
22 Training data generation unit
23 Annotation information generation unit
24 Extraction rule learning unit
25 Dictionary replication unit
100 Training data generation system
101 Characteristic expression extraction rule learning unit
102 Extraction rule storage unit
103 Storage unit for text data to be processed
104 Characteristic expression extraction unit
105 Extraction result storage unit
106 Characteristic expression extraction apparatus
107 Storage apparatus
300 Processor
301 Program memory
302 Storage medium
303 Interface
304 Video card
305 Input device
306 Display device

The invention claimed is:

1. A training data generation apparatus that generates training data used for creating characteristic expression extraction rules, comprising:

a training data candidate generation unit that assigns labels to labeled and unlabeled training data candidates by referring to an incomplete ground truth corpus, a training data candidate clustering unit that clusters a plurality of training data candidates including annotation errors and assigned labels indicating annotation classes based on feature values containing respective context information, and a training data generation unit that generates training data used for creating characteristic expression extraction rules, by referring to each cluster obtained using the clustering results, obtains the distribution of the labels of the training data candidates within the cluster, identifies training data candidates that meet a preset condition based on the obtained distribution, and generates training data using the identified training data candidates, wherein said context information is individual words, modifying or modified phrases in the vicinity of the units that constitute the training data candidates or training data, and wherein a processor operates as at least one of said training data candidate clustering unit and said training data generation unit.

2. The training data generation apparatus according to claim 1, wherein the training data generation unit uses training data candidates assigned a specified label in the cluster containing the specified label at or above a predetermined percentage as training data having said specified labels.

3. The training data generation apparatus according to claim 2, wherein the training data generation unit deletes training data candidates that are not assigned the specified label in the cluster containing the specified label at or above a predetermined percentage from the entire set of the training data candidates.

4. The training data generation apparatus according to claim 2, wherein the training data generation unit, obtains the degree of cluster membership for training data candidates that are not assigned the specified label in the cluster containing the specified label at or above a predetermined percentage, uses the training data candidates for which the obtained degree is not lower than a threshold value as training data, and deletes training data candidates for which the obtained degree is less than the threshold value from the entire set of the training data candidates.

5. The training data generation apparatus according to claim 4, wherein the training data generation unit uses one or more of the following criteria as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

6. The training data generation apparatus according to claim 1, wherein the training data candidate clustering unit configures the clustering condition such that one or more conditions are met during clustering among the following conditions: the distribution of the labels within each cluster varies between the clusters, there is a label with the highest percentage within each cluster, the number of training data candidates within each cluster exceeds a specified number, and the number of clusters is less than a specified number.

7. The training data generation apparatus according to claim 1, wherein the training data generation unit appends new feature values to the training data candidates used as the training data.

8. The training data generation apparatus according to claim 1, further comprising a training data candidate generation unit, wherein the training data candidate generation unit uses text data and annotation information assigned to each word contained in the text data to detect a feature value containing context information for every word string or word from a plurality of words obtained by segmenting the text data and generates the training data candidates by appending the feature value to each word or each word string.

9. The training data generation apparatus according to claim 8, further comprising an annotation information generation unit creating the annotation information, and a dictionary having registered therein a plurality of characteristic expressions and the respective classes of the plurality of characteristic expressions, wherein the annotation information generation unit compares the plurality of characteristic expressions registered in the dictionary with the text data, identifies the locations of occurrence where any of the plurality of characteristic expressions from the text data appear, and creates annotation information that identifies the position of the locations of occurrence and the classes of the characteristic expressions that appear.

10. The training data generation apparatus according to claim 9 further comprising an extraction rule learning unit and a dictionary replication unit, wherein the extraction rule learning unit learns characteristic expression extraction rules used to extract the characteristic expressions using the training data generated by the training data generation unit, and the dictionary replication unit extracts characteristic expressions from a corpus containing a plurality of documents using extraction rules learned by the extraction rule learning unit and adds and registers characteristic expressions that meet a preset condition among the extracted characteristic expressions, along with class information that identifies their classes, in the dictionary.

11. A characteristic expression extraction system comprising training data generation apparatus that generates training data used for creating characteristic expression extraction rules and a characteristic expression extraction apparatus, wherein the training data generation apparatus comprises:

a training data candidate generation unit that assigns labels to labeled and unlabeled training data candidates by referring to an incomplete ground truth corpus, a training data candidate clustering unit that clusters a plurality of training data candidates including annotation errors and assigned labels indicating annotation classes based on feature values containing respective context information, and a training data generation unit that, by referring to each cluster obtained using the clustering results, obtains the distribution of the labels of the training data candidates within the cluster, and, based on the obtained distribution, identifies training data candidates that meet a preset condition, and generates training data using the identified training data candidates, and the characteristic expression extraction apparatus learns characteristic expression extraction rules used to extract characteristic expressions using the training data generated by the training data apparatus and extracts the characteristic expressions from a corpus containing a plurality of documents using the learned characteristic expression extraction rules, wherein said context information is individual words, modifying or modified phrases in the vicinity of the units that constitute the training data candidates or training data, and wherein a processor operates as at least one of said training data candidate clustering unit and said training data generation unit.

12. A training data generation method used for generating training data utilized in the creation of characteristic expression extraction rules, the method comprising the steps of:

assigning labels to labeled and unlabeled training data candidates by referring to an incomplete ground truth corpus, clustering a plurality of training data candidates including annotation errors and assigned labels indicating annotation classes based on feature values containing respective context information, and by referring to each cluster obtained using the clustering results in said clustering step, obtaining the distribution of the labels of the training data candidates within the cluster, identifying training data candidates that meet a preset condition based on the obtained distribution, and generating training data using the identified training data candidates, wherein the context information is individual words, modifying or modified phrases in the vicinity of the units that constitute the training data candidates or training data, and the training data is utilized in the creation of characteristic expression extraction rules.

13. The training data generation method according to claim 12, wherein in Step (b), the training data candidates assigned a specified label in the cluster containing the specified label at or above a predetermined percentage are used as the training data having the specified label.

14. The training data generation method according to claim 13, wherein in Step (b), the training data candidates that are not assigned the specified label in the cluster containing the specified label at or above a predetermined percentage are deleted from the entire set of the training data candidates.

15. The training data generation method according to claim 13, wherein in Step (b), the degree of cluster membership is obtained for training data candidates that are not assigned the specified label in the cluster containing the specified label at or above a predetermined percentage, and the training data candidates for which the obtained degree is not lower than a threshold value are used as training data, while the training data candidates for which the obtained degree is less than the threshold value are deleted from the entire set of training data candidates.

16. The training data generation method according to claim 15, wherein in Step (b), one or more of the following criteria are used as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

17. The training data generation method according to claim 12, wherein in Step (a), during clustering, the clustering condition is configured such that one or more conditions are met among the following conditions: the distribution of the labels within each cluster varies between the clusters, there is a label with the highest percentage within each cluster, the number of training data candidates within each cluster exceeds a specified number, and the number of clusters is less than a specified number.

18. The training data generation method according to claim 12, wherein in Step (b), a new feature value is appended to the training data candidates used as the training data.

19. The training data generation method according to claim 12, further comprising the step of (c) using text data and annotation information assigned to each word contained in the text data to detect a feature value containing context information for every word string or word from a plurality of words obtained by segmenting the text data and generating training data candidates by appending the feature value to each word or each word string.

20. The training data generation method according to claim 19, further comprising the step of (d) using a dictionary having registered therein a plurality of characteristic expressions and the respective classes of the plurality of characteristic expressions to compare the plurality of characteristic expressions registered in the dictionary with the text data, identifying the locations of occurrence where any of the plurality of characteristic expressions from the text data appear, and creating annotation information that identifies the position of the locations of occurrence and the classes of the characteristic expressions that appear.

21. The training data generation method according to claim 20, further comprising the steps of:
 (e) learning characteristic expression extraction rules used to extract the characteristic expressions using the training data generated in Step (b), and
 (d) extracting characteristic expressions from a corpus containing a plurality of documents using extraction rules learned in Step (e) and adding and registering characteristic expressions that meet a preset condition among the extracted characteristic expressions, along with class information that identifies their classes, in the dictionary.

22. A non-transitory computer-readable storage medium having recorded thereon a software program utilized by a computer in the generation of training data used for creating characteristic expression extraction rules, the software program comprising instructions that direct the computer to perform the steps of:
 assigning labels to training data candidates by referring to an incomplete ground truth corpus,
 clustering a plurality of training data candidates including annotation errors and assigned labels indicating annotation classes based on feature values containing respective context information and,
 by referring to each cluster obtained using the clustering results in said clustering step, obtaining the distribution of the labels of the training data candidates within the cluster, identifying training data candidates that meet a preset condition based on the obtained distributions, and generating training data using the identified training data candidates,
 wherein said context information is individual words, modifying or modified phrases in the vicinity of the units that constitute the training data candidates or training data, and the training data is utilized in the creation of characteristic expression extraction rules.

23. The non-transitory computer-readable storage medium according to claim 22, wherein in Step (b), the training data candidates assigned a specified label in the cluster containing the specified label at or above a predetermined percentage are used as the training data having the specified label.

24. The non-transitory computer-readable storage medium according to claim 23, wherein in Step (b), the training data candidates that are not assigned the specified label in the cluster containing the specified label at or above a predetermined percentage are deleted from the entire set of the training data candidates.

25. The non-transitory computer-readable storage medium according to claim 23, wherein in Step (b), the degree of cluster membership is obtained for training data candidates that are not assigned the specified label in the cluster containing the specified label at or above a predetermined percentage, and the training data candidates for which the obtained degree is not lower than a threshold value are used as training data, while the training data candidates for which the obtained degree is less than the threshold value are deleted from the entire set of training data candidates.

26. The non-transitory computer-readable storage medium according to claim 25, wherein in Step (b), one or more of the following criteria are used as the degree of cluster membership of the training data candidates that are not assigned the specified labels: the distance between the training data candidates and a representative point of the cluster, the probability of membership of the training data candidates in the cluster, the estimated density of the training data candidates in the cluster, and the percentages of the specified label contained in the cluster.

27. The non-transitory computer-readable storage medium according to claim 22, wherein in Step (a), during clustering, the clustering condition is configured such that one or more conditions are met among the following conditions: the distribution of the labels within each cluster varies between the clusters, there is a label with the highest percentage within each cluster, the number of training data candidates within each cluster exceeds a specified number, and the number of clusters is less than a specified number.

28. The non-transitory computer-readable storage medium according to claim 22, wherein in Step (b), a new feature value is appended to the training data candidates used as the training data.

29. The non-transitory computer-readable storage medium according to claim 22, the software program further comprising instructions that direct the computer to execute the step of (c) using text data and annotation information assigned to each word contained in the text data to detect a feature value containing context information for every word string or word from a plurality of words obtained by segmenting the text data and generating training data candidates by appending the feature value to each word or each word string.

30. The non-transitory computer-readable storage medium according to claim 29, the software program further comprising instructions that direct the computer to execute the step of (d) using a dictionary having registered therein a plurality of characteristic expressions and the respective classes of the plurality of characteristic expressions to compare the plurality of characteristic expressions registered in the dictionary with the text data, identifying the locations of occurrence where any of the plurality of characteristic expressions from the text data appear, and creating annotation information that identifies the position of the locations of occurrence and the classes of the characteristic expressions that appear.

31. The non-transitory computer-readable storage medium according to claim 30, the software program further comprising instructions that direct the computer to execute the steps of:
 (e) learning characteristic expression extraction rules used to extract the characteristic expressions using the training data generated in Step (b), and (d) extracting characteristic expressions from a corpus containing a plurality of documents using extraction rules learned in Step (e) and adding and registering characteristic expressions that meet a preset condition among the extracted characteristic expressions, along with the class information that identifies their classes, in the dictionary.

* * * * *